US012804161B2

(12) United States Patent
Boyce et al.

(10) Patent No.: US 12,804,161 B2
(45) Date of Patent: Nov. 17, 2026

(54) REGION PACKING IN CODED VIDEO

(71) Applicant: Nokia Technologies Oy, Espoo (FI)

(72) Inventors: Jill Boyce, Portland, OR (US); Miska Matias Hannuksela, Tampere (FI); Honglei Zhang, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 19/171,620

(22) Filed: Apr. 7, 2025

(65) Prior Publication Data

US 2025/0317573 A1 Oct. 9, 2025

Related U.S. Application Data

(60) Provisional application No. 63/631,226, filed on Apr. 8, 2024.

(51) Int. Cl.

| | |
|---|---|
| ***H01L 29/94*** | (2006.01) |
| ***H04N 19/14*** | (2014.01) |
| ***H04N 19/169*** | (2014.01) |
| ***H04N 19/17*** | (2014.01) |
| ***H04N 19/70*** | (2014.01) |

(52) U.S. Cl.

CPC ............. *H04N 19/14* (2014.11); *H04N 19/17* (2014.11); *H04N 19/188* (2014.11); *H04N 19/70* (2014.11)

(58) Field of Classification Search

CPC ...... H04N 19/14; H04N 19/17; H04N 19/188; H04N 19/70; H04N 19/132; H04N 19/167; H04N 19/46; H04N 19/59

See application file for complete search history.

(56) References Cited

U.S. PATENT DOCUMENTS

| | | | | |
|---|---|---|---|---|
| 2003/0108099 | A1* | 6/2003 | Nagumo | G06T 9/20 375/E7.199 |
| 2005/0053294 | A1* | 3/2005 | Mukerjee | H04N 19/51 375/E7.125 |
| 2006/0126962 | A1* | 6/2006 | Sun | H04N 19/895 382/268 |
| 2019/0379856 | A1* | 12/2019 | Hur | H04N 5/2624 |
| 2023/0107834 | A1* | 4/2023 | Zhang | H04N 19/597 382/232 |

OTHER PUBLICATIONS

"Versatile Video Coding", Series H: Audiovisual and Multimedia Systems Infrastructure of audiovisual services—Coding of moving video, Recommendation ITU-T H.266, Aug. 2020, 516 pages.

"Versatile supplemental enhancement information messages for coded video bitstreams", Series H: Audiovisual and Multimedia Systems Infrastructure of audiovisual services—Coding of moving video, Recommendation ITU-T H.274, Aug. 2020, 86 pages.

(Continued)

*Primary Examiner* — Joseph Suh

(74) *Attorney, Agent, or Firm* — Nokia Technologies Oy

(57) ABSTRACT

An example apparatus includes: at least one processor; and at least one memory storing instructions that, when executed by the at least one processor, cause the apparatus at least to: determine rectangular regions of a picture; pack the rectangular regions of the picture into a packed picture; code the packed picture; signal the coded packed picture; and signal metadata describing the rectangular regions packed into the coded packed picture.

18 Claims, 13 Drawing Sheets

(56) References Cited

OTHER PUBLICATIONS

"High Efficiency Video Coding", Series H: Audiovisual And Multimedia Systems, Infrastructure of audiovisual services—Coding of moving video, Recommendation ITU-T H.265, Feb. 2018, 692 pages.
"Advanced Video Coding for Generic Audiovisual services", Series H: Audiovisual And Multimedia Systems, Infrastructure of audiovisual services—Coding of moving Video, Recommendation ITU-T H.264, Apr. 2017, 812 pages.
Boyce et al., "Annotated Regions SEI message for HEVC (Draft 1)", Joint Collaborative Team on Video Coding (JCT-VC) of ITU-T SG 16 WP 3 and ISO/IEC JTC 1/SC 29/WG 1, JCTVC-AE1012-v1, 31st Meeting, Apr. 13-20, 2018, pp. 1-10.
Boyce et al., "AHG9: Region packing information SEI", Joint Video Experts Team (JVET) of ITU-T SG 16 WP 3 and ISO/IEC JTC 1/SC 29, JVET-AHxxxx-vx, 34th Meeting, Apr. 17-24, 2024, pp. 1-10.

* cited by examiner

REGION PACKING IN CODED VIDEO

TECHNICAL FIELD

The examples and non-limiting embodiments relate generally to multimedia transport and, more particularly, to region packing in coded video.

BACKGROUND

It is known to perform data compression and data decompression in a multimedia system.

BRIEF DESCRIPTION OF THE DRAWINGS

The foregoing embodiments and other features are explained in the following description, taken in connection with the accompanying drawings, wherein.

DETAILED DESCRIPTION OF EXAMPLE EMBODIMENTS

Video coding standards such as VVC (ITU-T H.266) and its partner standard VSEI (ITU-T H.274), HEVC (ITU-T H.265), and AVC (ITU-T H.264) provide the ability to carry metadata associated with video within the coded video bitstream.

For some applications, specific regions of interest (ROIs) within a video are of greater interest than the rest of the video.

An SEI processing order (SPO) SEI message carries information indicating the preferred processing order, as determined by the encoder (i.e., the content producer), for different types of SEI messages that may be present in the bitstream. A processing order nesting (PON) SEI message includes one or more SEI messages that should be applied only as parts of the processing chain identified by an associated SEI processing order SEI message and should not be applied in a manner that would contradict with the processing chain identified by the associated SEI processing order SEI message.

There does not exist any interoperable solution to pack regions of interest of a video within a smaller picture coded in a video bitstream that enables reconstruction of target pictures using only the information contained within the bitstream.

The Annotated Regions SEI message for HEVC and VVC allows indication of regions within a coded picture, but does not describe packing the regions within a smaller picture.

This examples described herein enable an encoding system to pack selected regions of interest (ROIs) within a coded picture. Pixel rate complexity and bitrate can be reduced by coding smaller pictures containing only the specific regions of interest. The herein described SEI message enables interoperability for these applications by signaling the locations and sizes of the ROIs within the coded picture. To enable reconstruction of a target picture, optional signaling of corresponding region locations within a target picture may be performed. Flexible resampling of regions is provided.

The herein described SEI message carries metadata within a compressed video bitstream that describes rectangular regions within the decoded picture which had been extracted from a larger picture and packed into a smaller picture for coding. It enables reconstruction of a target picture from the specified regions.

Figure 1:
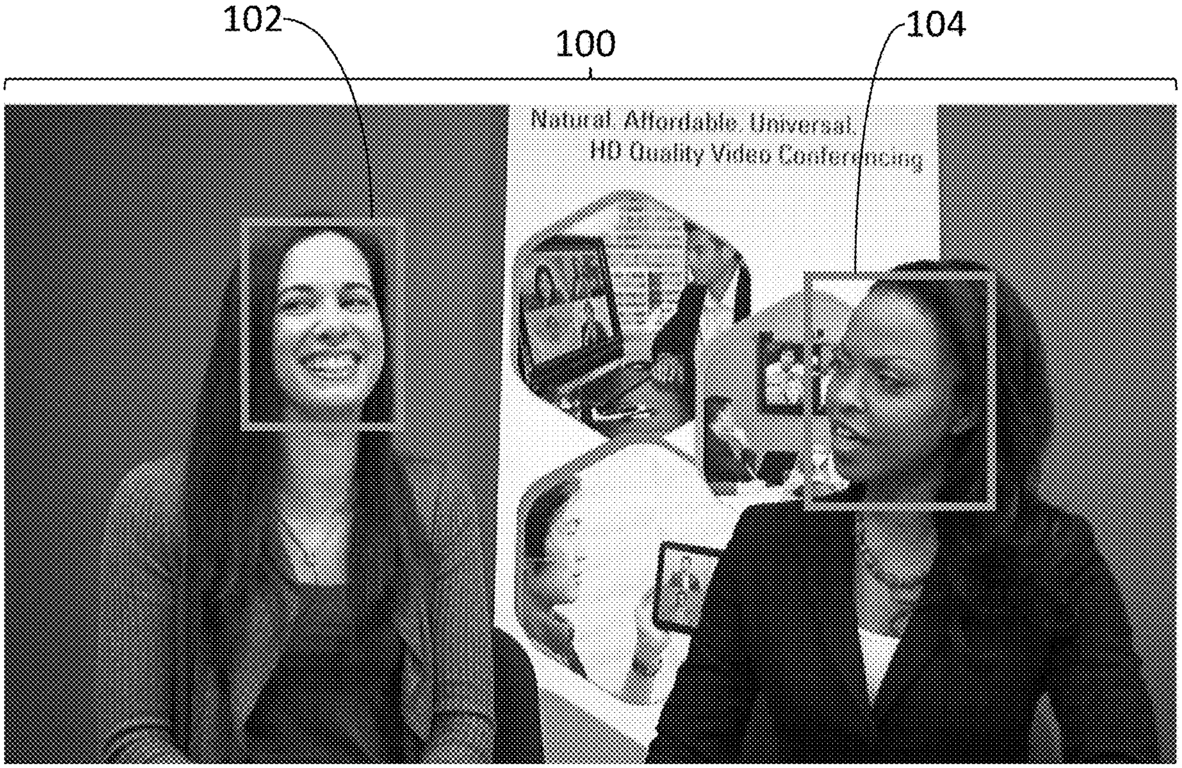
FIG. 1 shows an original picture with selected regions shown.
Figure 2A:
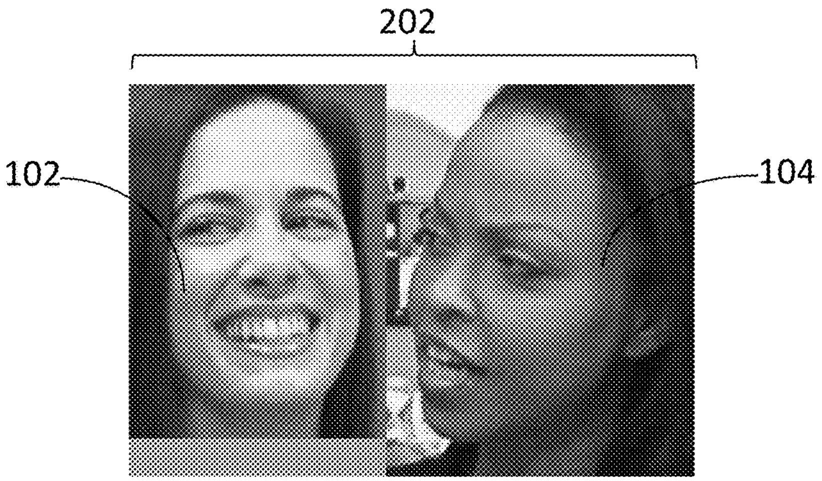
FIG. 2A shows a coded picture using a supplemental enhancement information message.
Figure 2B:
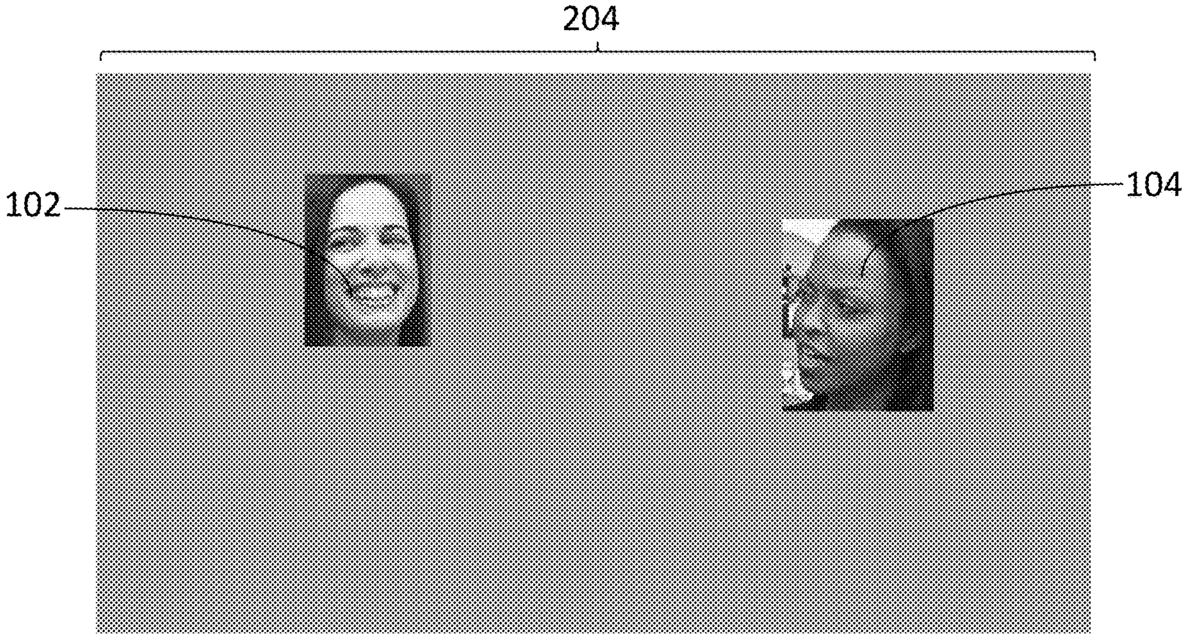
FIG. 2B shows a reconstructed target picture.

FIG. 1 shows an example with ROIs indicated (ROI 102 and ROI 104) of an original picture 100. FIG. 2A shows the coded picture 202 for the example shown in FIG. 1, and FIG. 2B shows the reconstructed target picture 204. The coded picture 202 includes the regions of interest ROI 102 and ROI 104, and the reconstructed target picture 204 comprises the regions of interest ROI 102 and ROI 104.

Figure 3A:
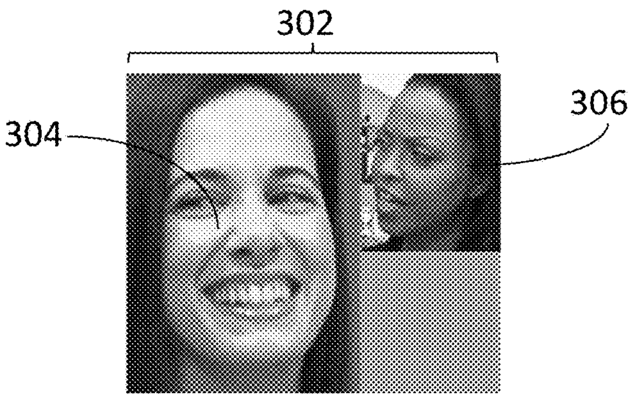
FIG. 3A shows a coded picture with region resampling.
Figure 3B:
FIG. 3B shows a reconstructed target picture with region resampling.

For certain applications, some regions of a video picture may require retaining full resolution while other regions may be downsampled. Selective resampling of regions is described herein. FIG. 3A shows an example coded picture 302 where one (namely region 306) of two regions is downsampled, where the two regions are region 304 and region 306. FIG. 3B shows the reconstructed target picture 308, which is very similar to FIG. 2B, but with the region 306 having a lower effective resolution (as compared to the resolution of region ROI 104 within the reconstructed target picture 204).

Figure 4A:
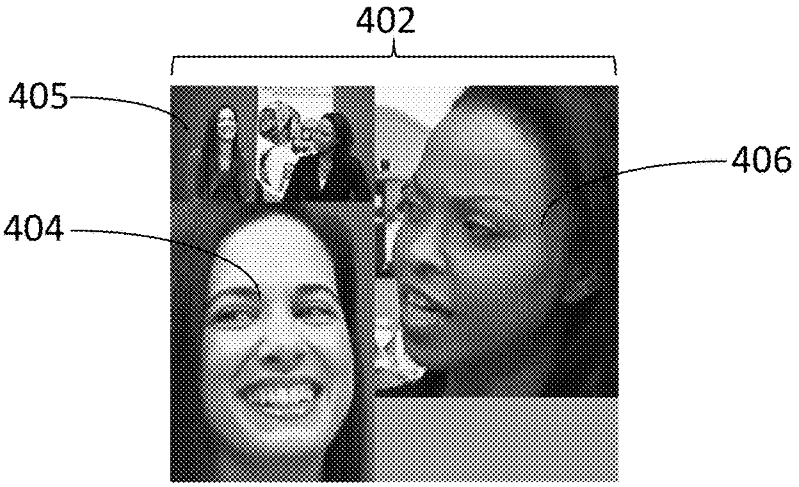
FIG. 4A shows a coded picture with background resampling.
Figure 4B:
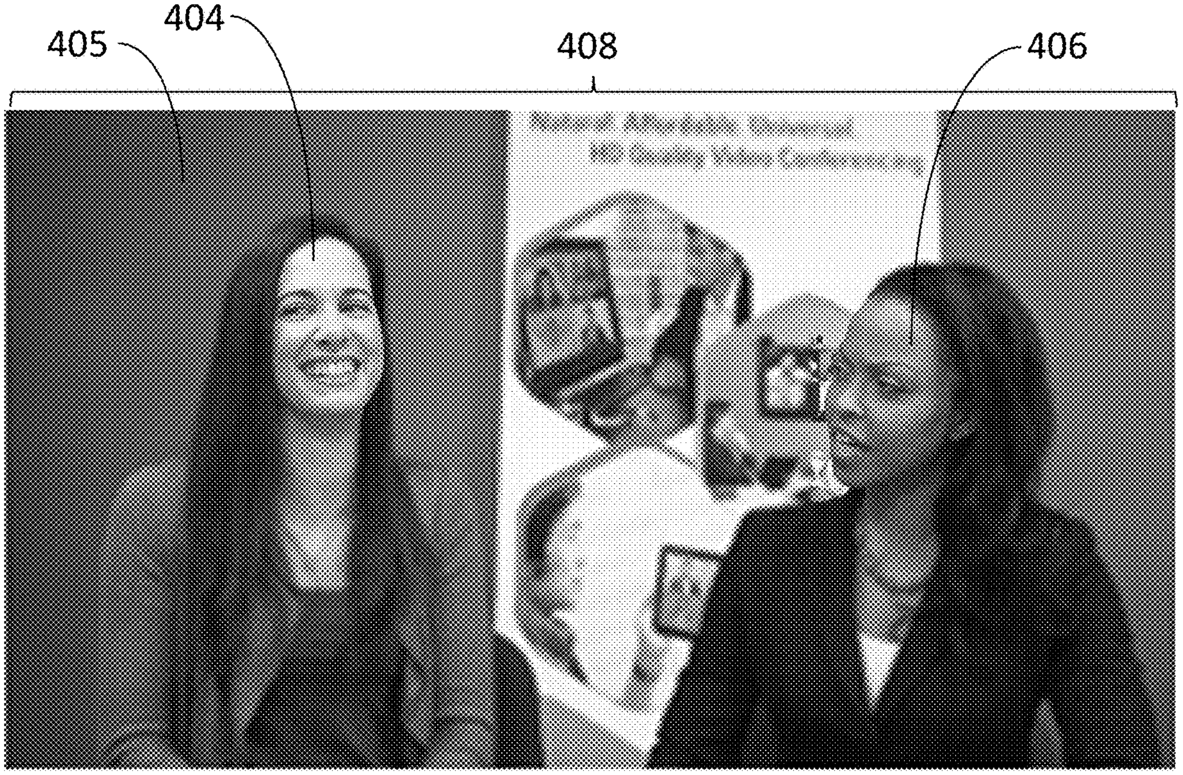
FIG. 4B shows a reconstructed target picture with background resampling.

Background regions may optionally be included within the coded picture, with the region ID used to determine precedence between regions in a reconstructed target picture. FIG. 4A shows an example coded picture 402 with background resampling, and FIG. 4B shows the reconstructed target picture 408. The reconstructed target picture 408 in FIG. 4B appears similar to the reconstructed target picture 204 in FIG. 2B, but the background 405 has a lower effective resolution. For example, the background 405 has a lower effective resolution than the resolution of rendered region 404 and rendered region 406, where rendered region 404 and rendered region 406 are regions of interest. An encoding system may choose to reduce bitrate by filtering or replacing the areas of the downsampled background corresponding to selected regions also signalled in the coded picture 402, but this was not done in the example shown in FIG. 4A and FIG. 4B.

Aspects of the examples described herein include the following:

- A region ID is optionally signalled for each region.
- For each region, the top left (x,y) position and (width, height) in the coded picture are signalled in "units", with unit size signalled as a power of 2.
- A flag indicates whether the position and size of a region are with respect to the picture dimensions of the current cropped decoded picture signalled in the PPS, or with respect to the max cropped picture dimensions signalled in the SPS, e.g. when adaptive picture resolution is used.
- The resolution of the target picture is optionally signalled, to enable optional reconstruction of the target picture.
- The top left location of each region within the target picture is optionally signalled.
- A list of resampling ratios as ratio of integers (numerator, denominator) is optionally signalled, with a selected resampling ratio signalled per region.
- In the target picture reconstruction process, sample values are initialized to mid-gray.
- Regions in the target picture may overlap. The region with the higher region ID has precedence in the reconstruction of the target picture.
- Persistence flag and cancel flags are signalled to specify persistence Syntax & Semantics

VSEI

| | Descriptor |
|---|---|
| packed_regions_info( payloadSize) | |
| pri_cancel_flag | u(1) |
| if ( !pri_cancel_flag ) { | |
| pri_persistence_flag | u(1) |
| pri_num_regions_minus1 | ue(v) |
| pri_use_max_dimensions_flag | u(1) |
| pri_log2_unit_size | u(4) |
| pri_region_size_len_minus1 | u(4) |
| pri_region_id_present_flag | u(1) |
| pri_target_pic_params_present_flag | u(1) |
| if( pri_target_pic_params_present_flag ) { | |
| pri_target_pic_width_minus1 | u(16) |
| pri_target_pic_height_minus1 | u(16) |
| } | |
| pri_num_resampling_ratios_minus1 | ue(v) |
| for( i = 1; i <= pri_num_resampling_ratios_minus1; i++ ) { | |
| pri_resampling_width_num_minus1[ i ] | ue(v) |
| pri_resampling_width_denom_minus1[ i ] | ue(v) |
| pri_fixed_aspect_ratio_flag[ i ] | u(1) |
| if( !pri_fixed_aspect_ratio_flag[ i ] ) { | |
| pri_resampling_height_num_minus1[ i ] | ue(v) |
| pri_resampling_height_denom_minus1[ i ] | ue(v) |
| } | |
| } | |
| for( i = 0; i <= pri_num_regions_minus1; i++ ) { | |
| if( pri_region_id_present_flag ) | |
| pri_region_id[ i ] | ue(v) |
| pri_region_top_left_in_units_x[ i ] | u(v) |
| pri_region_top_left_in_units_y[ i ] | u(v) |
| pri_region_width_in_units_minus1[ i ] | u(v) |
| pri_region_height_in_units_minus1[ i ] | u(v) |
| if( pri_num_resampling_ratios_minus1 > 0) | |
| pri_resampling_ratio_idx[ i ] | u(v) |
| if( pri_target_pic_params_present_flag ) | |
| pri_target_region_top_left_x[ i ] | u(v) |
| pri_target_region_top_left_y[ i ] | u(v) |
| } | |
| } | |
| } | |
| } | |

The packed regions info SEI message provides information regarding rectangular regions packed with the coded picture. This information may optionally be used to reconstruct a target picture from the samples of the cropped decoded picture corresponding to the regions described in this SEI message.

Use of this SEI message requires the definition of the following variables:

- A picture width and picture height in units of luma samples, denoted herein by PicWidthInLumaSamples and PicHeightInLumaSamples, respectively.
- A maximum picture width and maximum picture height in units of luma samples, denoted herein by MaxPicWidth and MaxPicHeight, respectively.
- A chroma format indicator, denoted herein by ChromaFormatIdc.
- A bit depth for the samples of the luma component, denoted herein by $BitDepth_Y$, and when ChromaFormatIdc is not equal to 0, a bit depth for the samples of the two associated chroma components, denoted herein by $BitDepth_C$.

pri_cancel_flag equal to 1 indicates that the SEI message cancels the persistence of any previous packed regions information SEI message in output order that applies to the current layer. pri_cancel_flag equal to 0 indicates that packed regions information follows.

pri_persistence_flag specifies the persistence of the packed regions information SEI message for the current layer.

pri_persistence_flag equal to 0 specifies that the packed regions information applies to the current decoded picture only.

pri_persistence_flag equal to 1 specifies that the packed regions information SEI message applies to the current decoded picture and persists for all subsequent pictures of the current layer in output order until one or more of the following conditions are true:

A new CLVS of the current layer begins.

The bitstream ends.

A picture in the current layer in an AU associated with a packed regions information SEI message is output that follows the current picture in output order.

pri_num_regions_minus1 plus 1 specifies the number of regions for which information is signalled.

pri_use_max_dimensions_flag equal to 1 specifies that MaxPicWidth, MaxPicHeight, PicWidthInLumaSamples and PicHeightInLumaSamples may be used in variable calculations. pri_use_max_dimensions_flag equal to 0 specifies that MaxPicWidth, MaxPicHeight, PicWidthInLumaSamples and PicHeightInLumaSamples may not be used in variable calculations for the region parameters.

pri_log 2_unit_size specifies a unit size used in variable calculations for the region parameters.

The variable priUnitSize is set equal to 1<<pri_log 2_unit_size.

pri_region_size_len_minus1 plus 1 specifies the number of bits used to signal pri_region_top_left_in_units_x[i], pri_region_top_left_in_units_y[i], pri_resampling_width_num_minus1[i], pri_resampling_width_denom_minus1[i], pri_resampling_height_num_minus1[i], and pri_resampling_height_denom_minus1[i].

pri_region_id_present_flag equal to 1 indicates the pri_region_id[i] syntax element is present. pri_region_id_present_flag equal to 1 indicates the pri_region_id[i] syntax element is not present.

pri_target_pic_params_present_flag equal to 1 indicates the pri_target_region_top_left_x[i], pri_target_region_top_left_y[i], pri_target_pic_width_minus1, and pri_target_pic_height_minus1 syntax elements are present. pri_target_pic_params_present_flag equal to 1 indicates the pri_target_region_top_left_x[i], pri_target_region_top_left_y[i], pri_target_pic_width_minus1, and pri_target_pic_height_minus1 syntax elements are not present.

pri_target_pic_width_minus1 plus 1 and pri_target_pic_height_minus1 plus 1, when present, indicate the width and height, respectively, in luma samples of the target picture that may be reconstructed from the samples of the cropped decoded picture corresponding to the regions described in this SEI message.

pri_num_resampling_ratios_minus1 specifies the number of resampling ratios that are signalled.

pri_resampling_width_num_minus1[i] plus 1 and pri_resampling_width_denom_minus1[i] plus 1 specify the numerator and denominator, respectively, for the width resampling of the i-th resampling ratio. Both pri_resampling_width_num_minus1[i] and pri_resampling_width_denom_minus1[i] shall be in the range of 0 to 65 535, inclusive.

The values of pri_resampling_ratio_width_num_minus1[0] and pri_resampling_ratio_width_denom_minus1[0] are inferred to be equal to 0.

pri_fixed_aspect_ratio_flag[i] equal to 1 specifies that the pri_resampling_height_num_minus1[i] and pri_resampling_height_denom_minus1[i] syntax elements are not present. pri_fixed_aspect_ratio_flag[i] equal to 0 specifies that the pri_resampling_height_num_minus1[i] and pri_resampling_height_denom_minus1[i] syntax elements are present.

pri_resampling_height_num_minus1[i] plus 1 and pri_resampling_height_denom_minus1[i] plus 1 specify the numerator and denominator, respectively, for the height resampling of the i-th resampling ratio. Both pri_resampling_height_num_minus1[i] and pri_resampling_height_denom_minus1[i] shall be in the range of 0 to 65 535, inclusive. When not present, the values of pri_resampling_height_num_minus1[i] and pri_resampling_height_denom_minus1[i] are inferred to be equal to the pri_resampling_width_num_minus1[i] and pri_resampling_width_denom_minus1[i], respectively.

pri_region_id[i] indicates the ID of the i-th region. When not present, the value of pri_region_id[i] is inferred to be equal to i.

pri_region_top_left_in_units_x[i] and pri_region_top_left_in_units_y[i] specify the horizontal and vertical positions, respectively, of the top left sample of the i-th region in units. The length of the syntax elements are pri_region_size_len_minus1+1.

The variables priRegionTopLeftX[i] and priRegionTopLeftY, representing the horizontal and vertical positions, respectively, in luma samples of the region in the cropped decoded picture, are derived as follows:

```
if( !pri_use_max_dimensions_flag ) {
  priRegionTopLeftX[ i ] =   pri_region_top_left_in_units_x[ i ] * priUnitSize
  priRegionTopLeftY[ i ] =   pri_region_top_left_in_units_y[ i ] * priUnitSize
} else {
  priRegionTopLeftX[ i ] =   ( pri_region_top_left_in_units_x[ i ] * priUnitSize *
    PicWidthInLumaSamples + MaxPicWidth /2 ) / MaxWidth
  priRegionTopLeftY[ i ] =   ( pri_region_top_left_in_units_y[ i ] * priUnitSize*
    PicHeightInLumaSamples + MaxPicHeight /2 ) / MaxHeight
}
```

pri_region_region_width_in_units_minus1[i] plus 1 and pri_region_height_in_units_minus1[i] plus 1 specify the horizontal and vertical positions, respectively, of the width and height of the i-th region in units. The length of the syntax elements are pri_region_size_len_minus1+1.

The variables priRegionWidth[i] and priRegionHeight[i], representing the width and height, respectively, in luma samples of the i-th region in the cropped decoded picture are derived as follows:

```
if( !pri_use_max_dimensions_flag ) {
  priRegionWidth[ i ] = ( pri_region_width_in_units_minus1 [ i ] + 1) *
priUnitSize
```

-continued

```
   priRegionHeight[ i ] = ( pri_region_height_in_units_minus1 [ i ] +1) *
priUnitSize
} else {
   priRegionWidth[ i ] = ( ( pri_region_width_in_units_minus1 [ i ] + 1) *
priUnitSize *
      PicWidthInLumaSamples + MaxPicWidth/2 ) / MaxWidth
   priRegionHeight[ i ] = ( ( pri_region_height_in_units_minus1 [ i ] + 1) *
priUnitSize *
      PicHeightInLumaSamples + MaxPicHeight/2 ) / MaxHeight
}
```

The variables SubWidthC and SubHeightC are derived from ChromaFormatIdc.

It is a requirement of bitstream conformance that priRegionWidth[i]% SubWidthC shall be equal to 0 and priRegionHeight[i]% SubHeightC shall be equal to 0.

pri_resampling_ratio_idx[i] specifies the index of the resampling ratio used for the i-th region. The length of the syntax element is Ceil(Log 2(pri_num_resampling_ratios_minus1+1)).

The variables priResampleWidthNum[i], priResampleWidthDenom[i], priResampleHeightNum[i] and priResampleHeightDenom[i] are derived as follows.

```
priResampleWidthNum[ i ] =
pri_resampling_width_num_minus1[ pri_rsampling_ratio_idx[ i ] ] + 1
   priResampleWidthDenom[ i ] =
        pri_resampling_width_denom_minus1[ pri_rsampling_ratio_idx[ i ] ] + 1
   priResampleHeightNum[ i ] =
      pri_resampling_height_num_minus1[ pri_rsampling_ratio_idx[ i ] ] + 1
   priResampleHeightDenom[ i ] =
        pri_resampling_height_denom_minus1[ pri_rsampling_ratio_idx[ i ] ] + 1
```

pri_target_region_top_left_x[i] and pri_target_region_top_left_y[i], when present, indicate the horizontal and vertical positions, respectively, of the top left sample position in luma samples of the i-th region in the reconstructed target picture.

The variables priTargetRegionWidth and priTargetHeight, representing the width and height, respectively, in luma samples of the resampled region in the reconstructed target picture, are derived as follows:

```
priTargetRegionWidth = Round( ( priRegionWidth[ i ] * priResampleWidthNum[ i ] ) ÷
   ( priResampleWidthDenom[ i ] * SubWidthC ) ) * SubWidthC
priTargetRegionHeight = Round( ( priRegionHeight[ i ] * priResampleHeightNum[ i ] ) ÷
   ( priResampleHeightDenom[ i ] * SubHeightC ) ) * SubHeightC
```

When reconstructing a target picture with luma sample array of size (pri_target_pic_width_minus1+1)×(pri_target_pic_height_minus1+1), all luma sample values are initialized to value 1<<($BitDepth_Y$−1) and chroma samples, if present, to 1<<($BitDepth_C$−1).

If for any sample position (x,y) and regions j and k the following conditions are all met:

```
pri_region_id[ j ] > pri_region_id[ k ]
x is in (priRegionTopLeftX[ j ] .. priRegionTopLeftX[ j ] + priRegionWidth[ j ])
y is in (priRegionTopLeftY[ j ] .. priRegionTopLeftY[ j ] + priRegionHeight[ j ]
x is in (priRegionTopLeftX[ k ] .. priRegionTopLeftX[ k ] + priRegionWidth[ k])
y is in (priRegionTopLeftY[ k ] .. priRegionTopLeftY[ k ] + priRegionHeight[ k ]
```

Then the reconstructed target picture sample at position (x, y) should be determined by the parameters signalled for the j-th region.

VVC

D.12.13 Use of the Packed Regions Information SEI Message

For purposes of interpretation of the packed regions information SEI message, the following variables are specified:

PicWidthInLumaSamples is set equal to the value of pps_pic_width_in_luma_samples−SubWidthC*(pps_conf_win_left_offset+pps_conf_win_right_offset).

PicHeightInLumaSamples is set equal to the value of pps_pic_height_in_luma_samples−SubHeightC*(pps_conf_win_top_offset+pps_conf_win_bottom_offset).

MaxPicWidth is set equal to the value of sps_pic_width_in_luma_samples−SubWidthC*(sps_conf_win_left_offset+sps_conf_win_right_offset).

MaxPicHeight is set equal to the value of sps_pic_height_in_luma_samples−SubHeightC*(sps_conf_win_top_offset+sps_conf_win_bottom_offset).

ChromaFormatIdc is set equal to sps_chroma_format_idc.

$BitDepth_Y$ and $BitDepth_C$ are both set equal to BitDepth.

Variations:

The above syntax and semantics describe using the cropped decoded picture, which is output. Alternatively, the decoded picture without cropping could be used.

Resampling ratios signaling may be done in other ways. For example, preset ratios, such as 1/4x, 1/2x, 1x, 2x, 4x, etc. could be selected and signaled via an index.

A unit size is described to signal the top-left (x, y) position and region width and height. Those parameters could be signaled in other ways. For example, the unit size could be predetermined and not signaled. Or, those parameters could be signaled without using a unit size, and instead in units of luma samples. The unit size may be signaled as a power of 2, but could alternatively be signaled another way, such as being directly signaled.

Support may be added for rotating (e.g. by 90, 180, 270 degrees) and vertical or horizontal mirroring of regions, which may help with coding efficiency and with reduction of picture size. There are 8 possible rotation/orientations which can be explicitly listed and indexed. In general, support may include, but may not be limited to, rotation or mirroring transformations.

The target picture background sample values are described to be initialized to mid-gray. The color of the background sample may be explicitly signaled.

An encoding system may include an identifier of the method to fill in the target picture background sample values in the packed regions SEI message. A decoding system may decode an identifier of the method to fill in the target picture background sample values in the packed regions SEI message. The methods may include, but may not be limited to, one or more of the following: i) filling the background sample values by mid-gray; ii) filling the background sample values by a signaled color.

An encoding system may select the indicated background filling method and/or its parameters, such as the signaled color for constant color filling, based on processing stages that follow in a processing order.

In an example, a task neural network for a computer vision task, such as object detection, follows the reconstruction of the target picture in a processing order for a decoding system. The task neural network has been trained to treat constant color areas with a particular color and/or the borders of such constant color area so that they do not cause false detections or alike. An encoding system therefore indicates the background filling method with constant color and the color that has been used in the training of the task neural network. In an example embodiment, a task neural network is trained with the knowledge of the background filling method and/or its parameters.

A region ID values is optionally signaled. The region ID can be required to be signaled for each region, or can be not signaled.

Region ID is used to determine which region takes precedence in overlapping regions in the target picture (e.g., z-depth.) If region ID is not present, the region index (e.g. order in which region was signaled) can be used to determine precedence in the target picture. When forming the target picture, in overlapping regions the region with highest precedence is used, replacing any region with lower precedence.

A flag can be added to indicate that regions with the same region ID are semantically consistent. For example, an encoding system may use the flag to indicate that a region ID value remains semantically consistent, when the encoding system has determined regions based on object tracking and regions correspond to bounding boxes of tracked objects. In this case, a particular region ID indicates the same tracked object.

An identifier may be included in the packed regions SEI message to indicate a specific region. For example, if object detection had been used, each region may represent a different object, and the identifiers are used to identify the individual objects.

Applying the Packed Regions SEI Message as a Part of an SEI Processing Order

An encoding system may include the packed regions SEI message type in a SPO SEI message to indicate that a decoding system is expected to reconstruct the target picture based on the information in the packed regions SEI message. When the packed regions SEI message is not the first processing stage described in a SPO SEI message, the encoding system may include the packed regions SEI message(s) in PON SEI message(s).

A decoding system may decode the packed regions SEI message type from a SPO SEI message to conclude that the decoding system is expected to reconstruct the target picture based on the information in the packed regions SEI message. When the packed regions SEI message is not the first processing stage described in a SPO SEI message, the decoding system may decode the packed regions SEI message(s) from PON SEI message(s).

When the packed regions SEI message is not the first processing stage described in a SPO SEI message, the above syntax and semantics apply to the output picture of the previous processing stage described in the SPO SEI message rather than cropped decoded picture.

Controlling Post-Filters

A decoding system may include one or more post-processing filters (a.k.a. post-filters). A post-filter may, for example, be a neural-network post-filter (NNPF). Post-filters may have different purposes. For example, a post-filter may aim at improving a machine task performance.

In an embodiment, a post-filter is performed prior to reconstruction of a target picture based on a packed regions SEI message. For example, a cropped decoded picture may be given as input to a post-filter. Additionally, the information in the packed regions SEI message or any information derived from the packed regions SEI message may be provided to the post-filter. The post-filter may utilize the information, for example, to avoid filtering across region boundaries, which may be beneficial to avoid sample values outside of a region to affect the filtering of the region.

In an embodiment, a post-filter is performed for a target picture that has been reconstructed based on a packed regions SEI message. Additionally, the information in the packed regions SEI message or any information derived from the packed regions SEI message, such as the region boundaries within the target picture, may be provided to the post-filter. The post-filter may utilize the information, for example, to avoid filtering across region boundaries, which may be beneficial to avoid sample values outside of a region to affect the filtering of the region.

Controlling in-Loop Filters

In an embodiment, information of a packed regions SEI message is included in a syntax structure with a mandatory decoding process. For example, region coordinates, width, and height within the cropped decoded picture may be included in a picture header rather than in a packed regions SEI message. The decoding process may disable in-loop filtering processes, such as deblocking, sample adaptive offset filtering, and/or adaptive loop filtering, across the region boundaries decoded from that syntax structure.

Accordingly, described herein is a resampling ratio list that is provided or signaled as ratio of integers, with an option to use fixed aspect ratio to reduce signaling; handling of adaptive resolution change feature in VVC by using max picture size signalled in SPS and current picture size signalled in PPS; precedence in target picture based on region ID or region signaling order; signaling of unit size to reduce bitrate for signaling each region position/size (in coded picture, but not in target picture); optional signaling of target picture location, with no need to signal size, because the target picture location may be inferred by the resampling ratio, and with a specific rule for determining target picture region size for arbitrary resampling ratio; the method can be used for coding foreground and background regions separately within a single coded picture (although limited to rectangular regions without a mask); and applying the target picture reconstruction as a processing stage of an SEI processing order so that a subsequent processing stage takes the target picture as its input.

The examples described herein are applicable to multiple applications targeted by the Video Coding for Machines (VCM) project, such as surveillance and face recognition. When the examples described herein are used with VSEI, the SEI message may be included in the bitstream. The examples described herein are further related non-normative operations.

Figure 5:
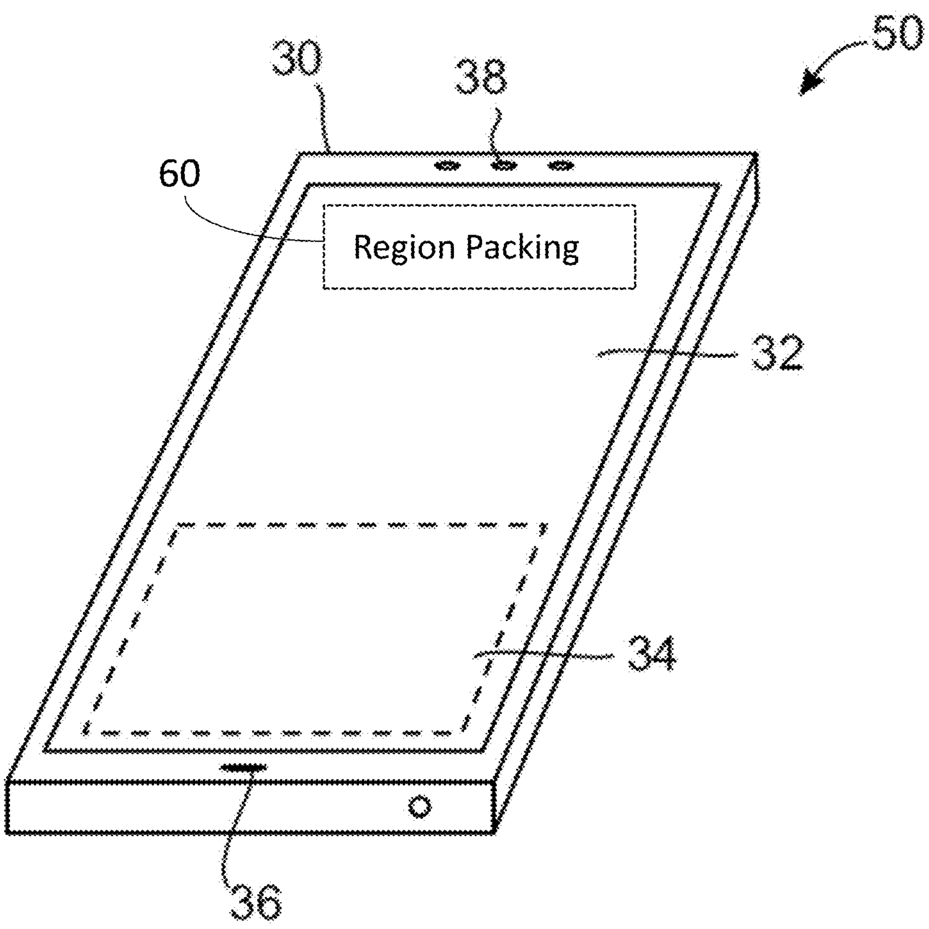
FIG. 5 shows schematically a user equipment suitable for employing embodiments of the examples described herein.

FIG. 5 shows a layout of an apparatus 50 according to an example embodiment. The apparatus 50 may for example be a mobile terminal or user equipment of a wireless communication system, a sensor device, a tag, or other lower power device. However, the embodiments of the examples described herein may be implemented within any electronic device or apparatus which may encode or decode multimedia content.

The apparatus 50 may comprise a housing 30 for incorporating and protecting the device. The apparatus 50 further may comprise a display 32 in the form of a liquid crystal display. In other embodiments of the examples described herein the display may be any suitable display technology suitable to display an image or video. The apparatus 50 may further comprise a keypad 34. In other embodiments of the examples described herein any suitable data or user interface mechanism may be employed. For example the user interface may be implemented as a virtual keyboard or data entry system as part of a touch-sensitive display.

The apparatus may comprise a microphone 36 or any suitable audio input which may be a digital or analog signal input. The apparatus 50 may further comprise an audio output device which in embodiments of the examples described herein may be any one of: an earpiece 38, speaker, or an analog audio or digital audio output connection. The apparatus 50 may also comprise a battery (or in other embodiments of the examples described herein the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection. As shown in FIG. 5, apparatus 50 may include circuitry configured to perform region packing 60, based on the examples described herein.

Figure 6:
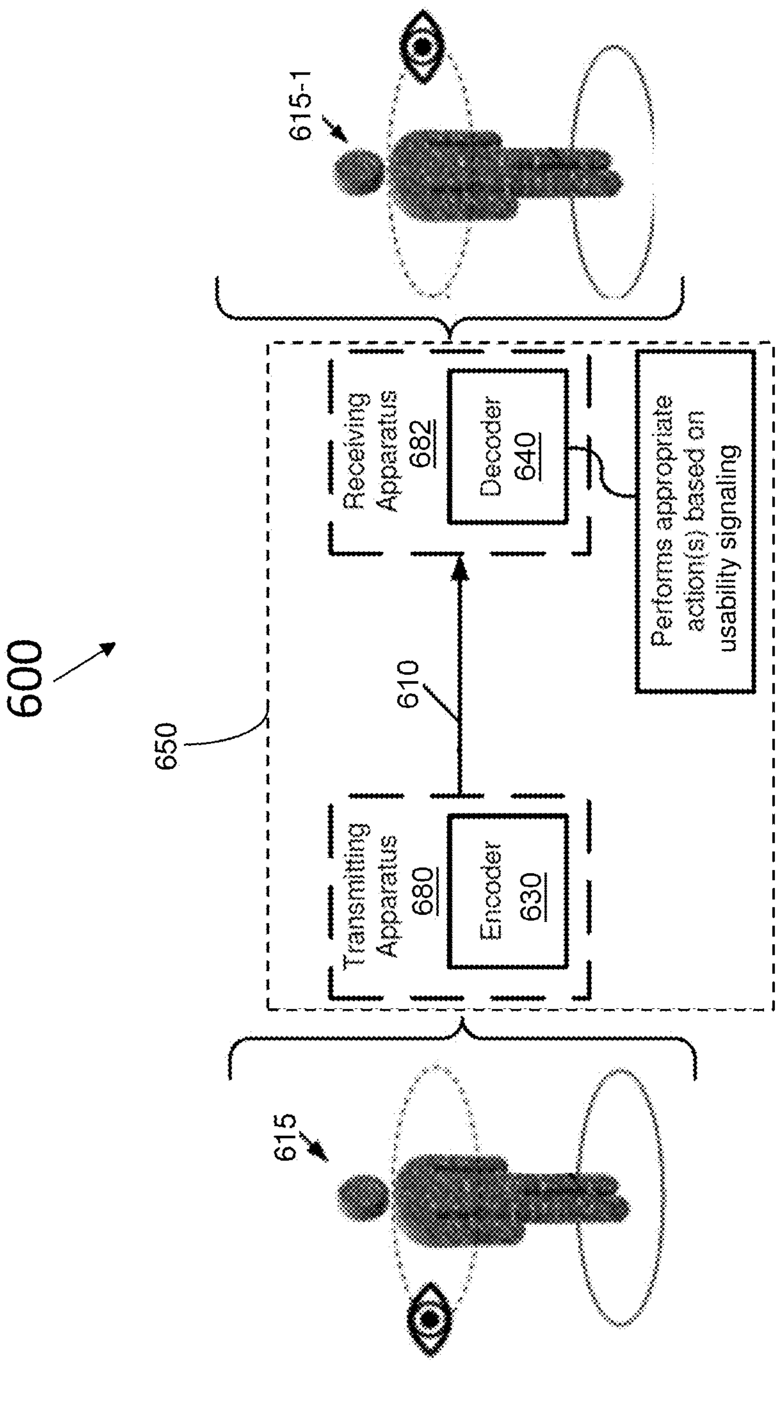
FIG. 6 is a block diagram illustrating a system in accordance with an example.

FIG. 6 is a block diagram illustrating a system 600 in accordance with several examples. In an example, the encoder 630 is used to encode an image or video from the scene 615, and the encoder 630 is implemented in a transmitting apparatus 680. The encoder 630 produces a bitstream 610 comprising signaling that is received by the receiving apparatus 682, which implements a decoder 640. The encoder 630 sends the bitstream 610 that comprises the herein described signaling. The decoder 640 forms the image or video for the scene 615-1, and the receiving apparatus 682 would present this to the user, e.g., via a smartphone, television, or projector among many other options.

In some examples, the transmitting apparatus 680 and the receiving apparatus 682 are at least partially within a common apparatus, and for example are located within a common housing 650. In other examples the transmitting apparatus 680 and the receiving apparatus 682 are at least partially not within a common apparatus and have at least partially different housings. Therefore in some examples, the encoder 630 and the decoder 640 are at least partially within a common apparatus, and for example are located within a common housing 650. For example the common apparatus comprising the encoder 630 and decoder 640 implements a codec. In other examples the encoder 630 and the decoder 640 are at least partially not within a common apparatus and have at least partially different housings, but when together still implement a codec.

Figure 7:
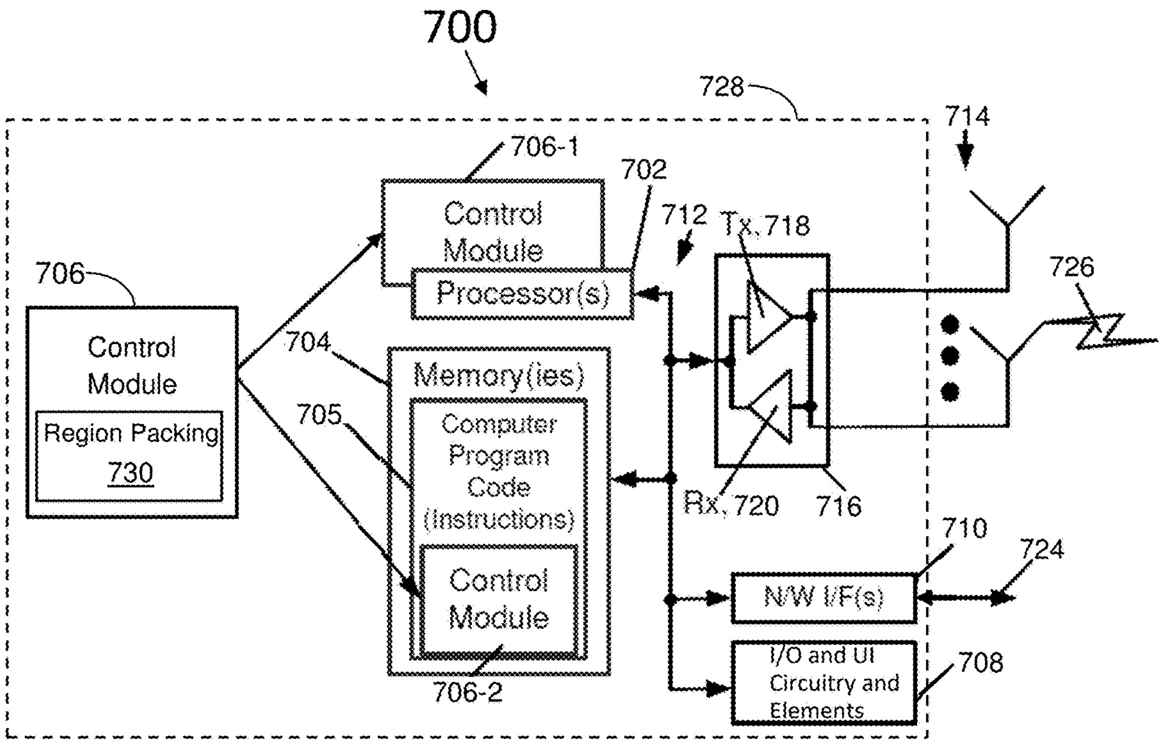
FIG. 7 is an example apparatus configured to implement the examples described herein.

FIG. 7 is an example apparatus 700, which may be implemented in hardware, configured to implement the examples described herein. The apparatus 700 comprises at least one processor 702 (e.g., an FPGA and/or CPU), at least one memory 704 including computer program code 705, the computer program code 705 having instructions to carry out the methods described herein, wherein the at least one memory 704 and the computer program code 705 are configured to, with the at least one processor 702, cause the apparatus 700 to implement circuitry, a process, component, module, or function (implemented with control module 706) to implement the examples described herein.

Apparatus 700 may be a smartphone, personal digital device or assistant, smart television, laptop, tablet, head-mounted display (HMD) or other user device or terminal device. The at least one memory 704 may be a non-transitory memory, a transitory memory, a volatile memory (e.g. RAM), or a non-volatile memory (e.g., ROM).

Region packing 730 implements the examples described herein related to region packing.

The apparatus 700 includes a display and/or I/O interface 708, which includes user interface (UI) circuitry and elements, that may be used to display features or a status of the methods described herein (e.g., as one of the methods is being performed or at a subsequent time), or to receive input from a user such as with using a keypad, camera, touch-screen, touch area, microphone, biometric recognition, one or more sensors, etc. The apparatus 700 includes one or more communication e.g. network (N/W) interfaces (I/F(s)) 710. The communication I/F(s) 710 may be wired and/or wireless and communicate over the Internet/other network(s) via any communication technique including via one or more links 724. The communication I/F(s) 710 may comprise one or more transmitters or one or more receivers.

The transceiver 716 comprises one or more transmitters 718 and one or more receivers 720. The transceiver 716 and/or communication I/F(s) 710 may comprise standard well-known components such as an amplifier, filter, frequency-converter, (de)modulator, and encoder/decoder circuitries and one or more antennas, such as antennas 714 used for communication over wireless link 726.

The control module 706 of the apparatus 700 comprises one of or both parts 706-1 and/or 706-2, which may be implemented in a number of ways. The control module 706 may be implemented in hardware as control module 706-1, such as being implemented as part of the at least one processor 702. The control module 706-1 may be implemented also as an integrated circuit or through other hardware such as a programmable gate array. In another example, the control module 706 may be implemented as control module 706-2, which is implemented as computer program code (having corresponding instructions) 705 and is executed by the at least one processor 702. For instance, the at least one memory 704 store instructions that, when executed by the at least one processor 702, cause the apparatus 700 to perform one or more of the operations as described herein. Furthermore, the at least one processor 702, the at least one memory 704, and example algorithms (e.g., as flowcharts and/or signaling diagrams), encoded as instructions, programs, or code, are means for causing performance of the operations described herein.

The apparatus 700 to implement the functionality of control module 706 may correspond to any of the apparatuses depicted herein. Alternatively, apparatus 700 and its elements may not correspond to any of the other apparatuses depicted herein, as apparatus 700 may be part of a self-organizing/optimizing network (SON) node or other node, such as a node in a cloud.

The apparatus 700 may also be distributed throughout the network including within and between apparatus 700 and any network element (such as a base station and/or terminal device and/or user equipment).

Interface 712 enables data communication and signaling between the various items of apparatus 700, as shown in FIG. 7. For example, the interface 712 may be one or more buses such as address, data, or control buses, and may include any interconnection mechanism, such as a series of lines on a motherboard or integrated circuit, fiber optics or other optical communication equipment, and the like. Computer program code (e.g. instructions) 705, including control module 706 may comprise object-oriented software configured to pass data or messages between objects within computer program code 705. Computer program code (e.g. instructions) 705, including control module 706 may comprise procedural, functional, or scripting code. The apparatus 700 need not comprise each of the features mentioned, or may comprise other features as well. The various components of apparatus 700 may at least partially reside in a common housing 728, or a subset of the various components of apparatus 700 may at least partially be located in different housings, which different housings may include common housing 728.

Figure 8:
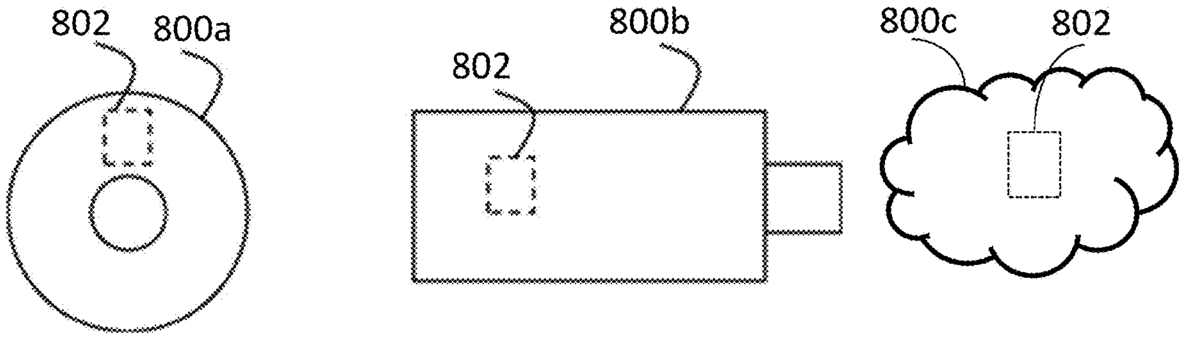
FIG. 8 shows a representation of an example of non-volatile memory media used to store instructions that implement the examples described herein.

FIG. 8 shows a schematic representation of non-volatile memory media 800*a* (e.g. computer/compact disc (CD) or digital versatile disc (DVD)) and 800*b* (e.g. universal serial bus (USB) memory stick) and 800*c* (e.g. cloud storage for downloading instructions and/or parameters 802 or receiving emailed instructions and/or parameters 802) storing instructions and/or parameters 802 which when executed by a processor allows the processor to perform one or more of the operations of the methods described herein. Instructions and/or parameters 802 may represent or correspond to a non-transitory computer readable medium.

Figure 9:
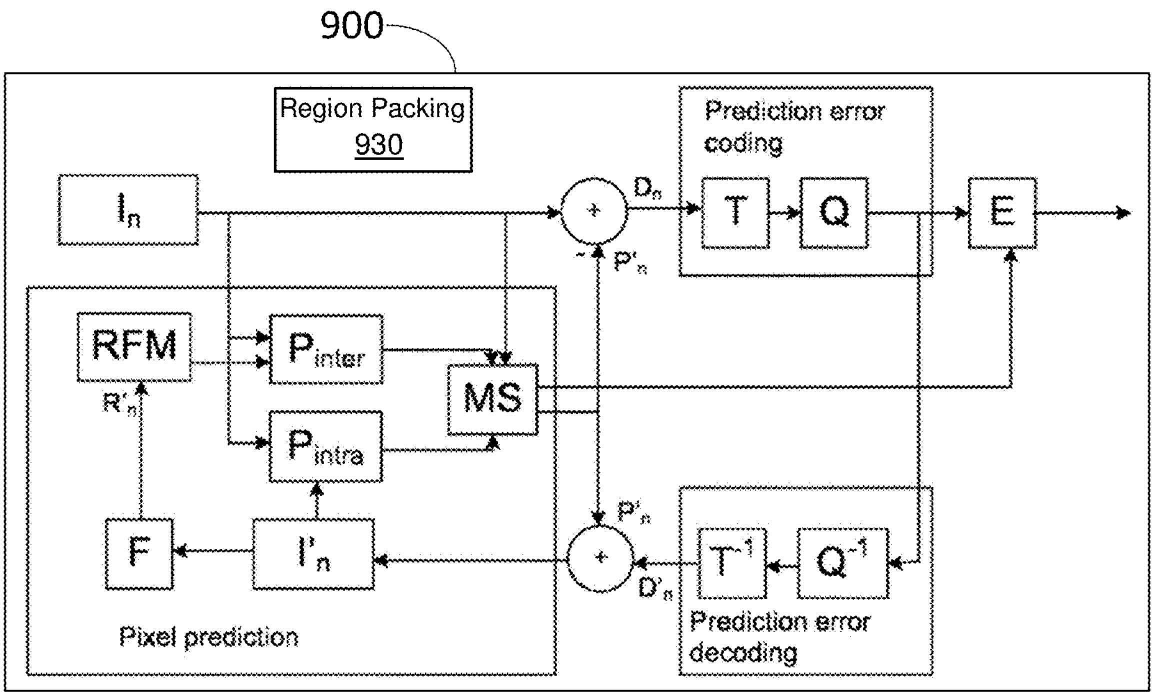
FIG. 9 shows an encoder according to an embodiment.

FIG. 9 shows an encoder 900 according to an embodiment. FIG. 9 illustrates an image to be encoded ($I^n$), a predicted representation of an image block ($P'^n$), a prediction error signal ($D^n$), a reconstructed prediction error signal ($D'^n$), a preliminary reconstructed image ($I'^n$), a final reconstructed Image ($R'^n$), a transform (T) and inverse transform ($T^{-1}$), a quantization (Q) and inverse quantization ($Q^{-1}$), entropy encoding (E), a reference frame memory (RFM), inter prediction ($P^{inter}$), intra prediction ($P^{intra}$), mode selection (MS) and filtering (F). Region packing 930 implements the examples described herein related to packing ROIs within a coded picture.

Figure 10:
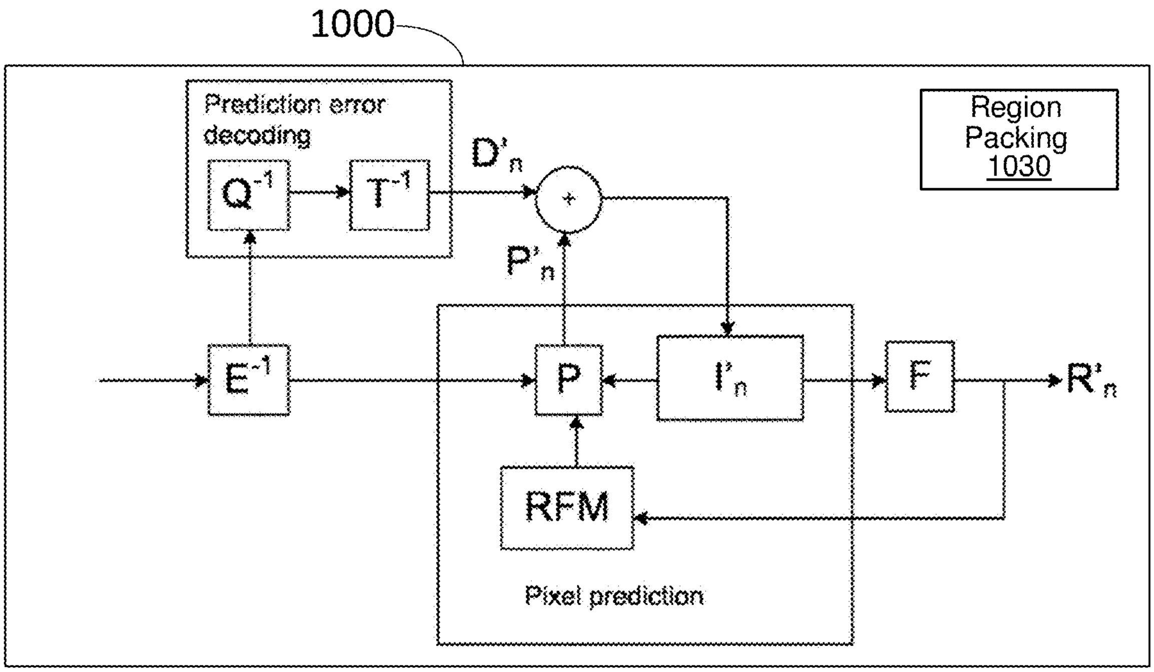
FIG. 10 shows a decoder according to an embodiment.

FIG. 10 shows a decoder 1000 according to an embodiment. FIG. 10 illustrates a predicted representation of an image block ($P'^n$), a reconstructed prediction error signal ($D'^n$), a preliminary reconstructed image ($I'^n$), a final reconstructed image ($R'^n$), an inverse transform ($T^{-1}$), an inverse quantization ($Q^{-1}$), an entropy decoding (F) a reference frame memory (RFM), a prediction (either inter or intra) (P), and filtering (F). Region packing 1030 implements the examples described herein related to decoding packed ROIs from a coded picture.

Figure 11:
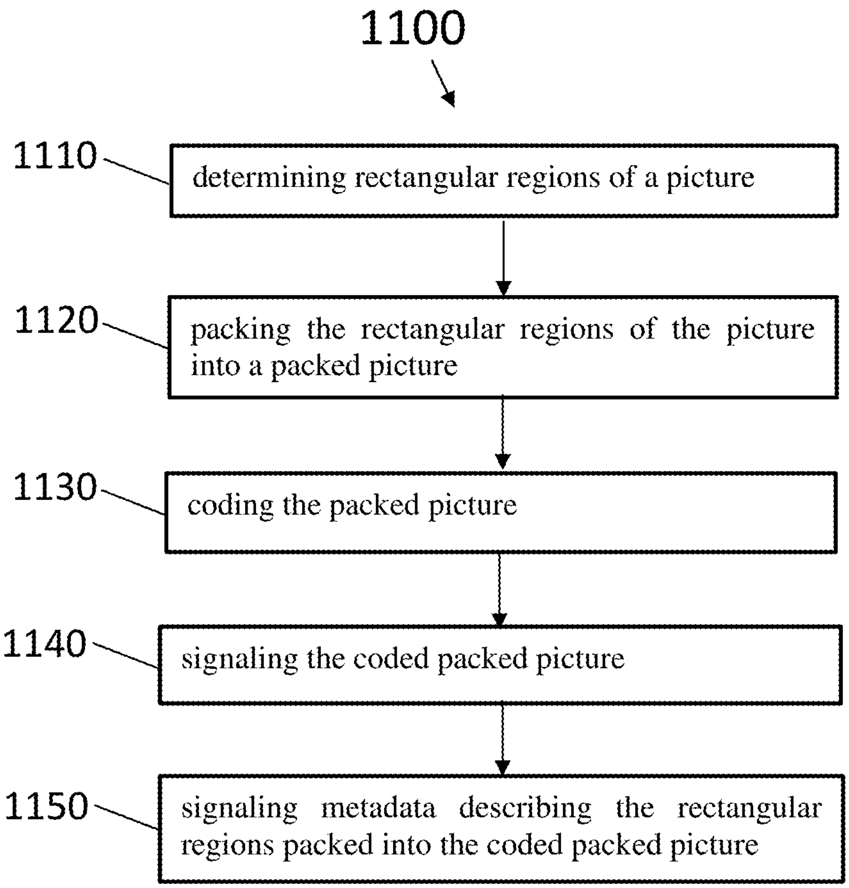
FIG. 11 is an example method, based on the examples described herein.

FIG. 11 is an example method 1100, based on the examples described herein. At 1110, the method includes determining rectangular regions of a picture. At 1120, the method includes packing the rectangular regions of the picture into a packed picture. At 1130, the method includes coding the packed picture. At 1140, the method includes signaling the coded packed picture. At 1150, the method includes signaling metadata describing the rectangular regions packed into the coded packed picture. Method 1100 may be performed with apparatus 50, encoder 630, apparatus 700, encoder 900 using region packing 930, or encoder 2.

Figure 12:
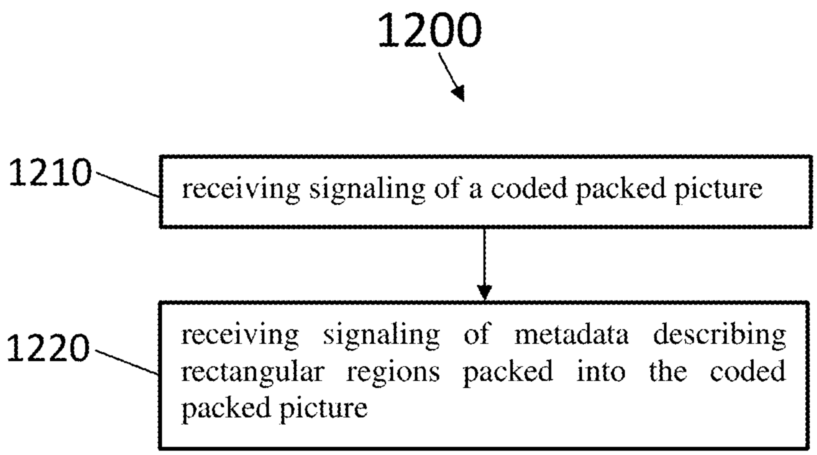
FIG. 12 is an example method, based on the examples described herein.

FIG. 12 is an example method 1200, based on the examples described herein. At 1210, the method includes receiving signaling of a coded packed picture. At 1220, the method includes receiving signaling of metadata describing rectangular regions packed into the coded packed picture. Method 1200 may be performed with apparatus 50, decoder 640, apparatus 700, decoder 1000 using region packing 1030, or decoder 4.

Figure 13:
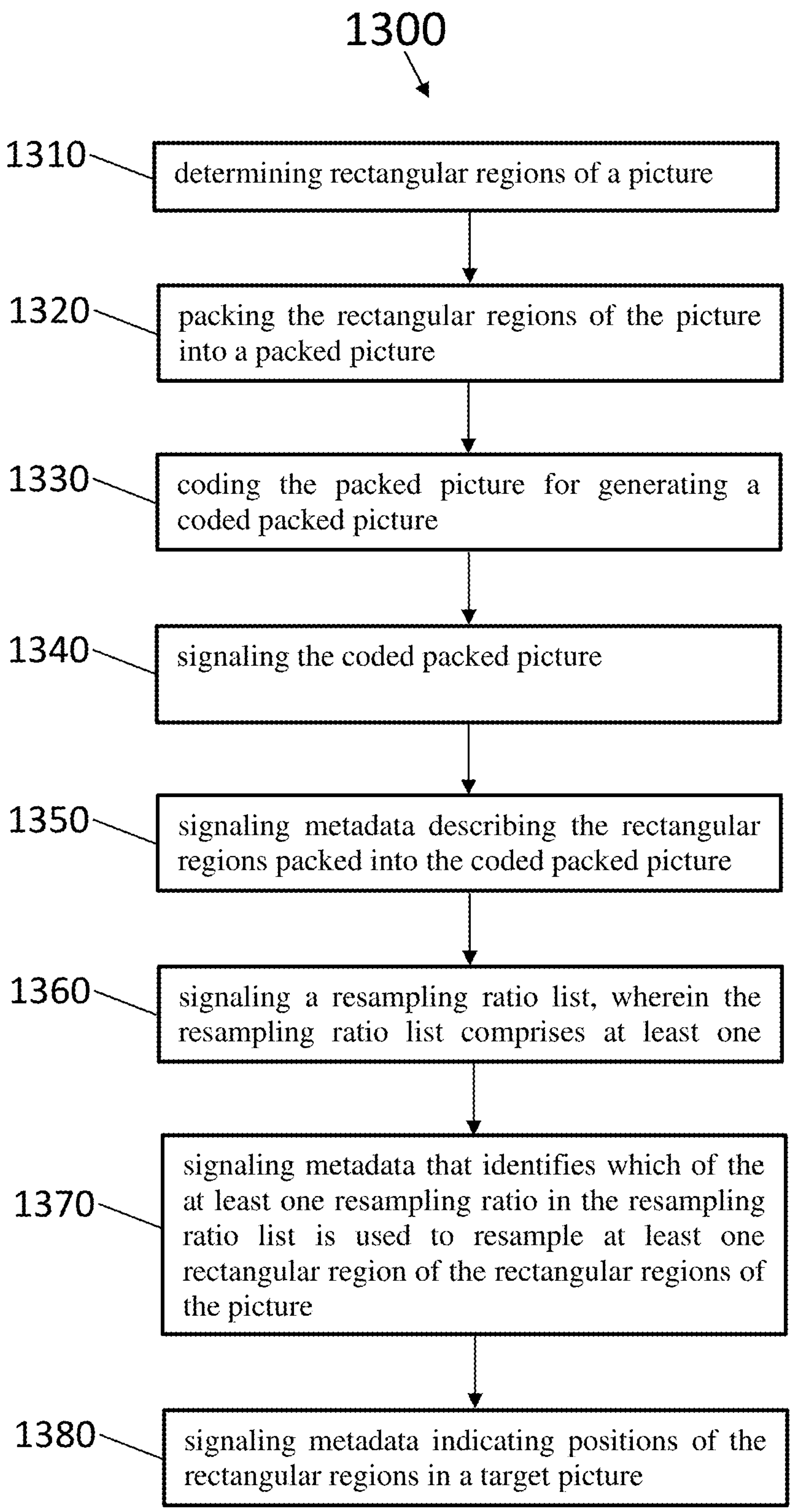
FIG. 13 is an example method, based on the examples described herein.

FIG. 13 is an example method 1300, based on the examples described herein. At 1310, the method includes determining rectangular regions of a picture. At 1320, the method includes packing the rectangular regions of the picture into a packed picture. At 1330, the method includes coding the packed picture for generating a coded packed picture. At 1340, the method includes signaling the coded packed picture. At 1350, the method includes signaling metadata describing the rectangular regions packed into the coded packed picture. At 1360, the method includes signaling a resampling ratio list, wherein the resampling ratio list comprises at least one resampling ratio. At 1370, the method includes signaling metadata that identifies which of the at least one resampling ratio in the resampling ratio list is used to resample at least one rectangular region of the rectangular regions of the picture. At 1380, the method includes signaling metadata indicating positions of the rectangular regions in a target picture.

The method 1300 may be performed with apparatus 50, encoder 630, apparatus 700, encoder 900 using region packing 930, or encoder 2.

Figure 14:
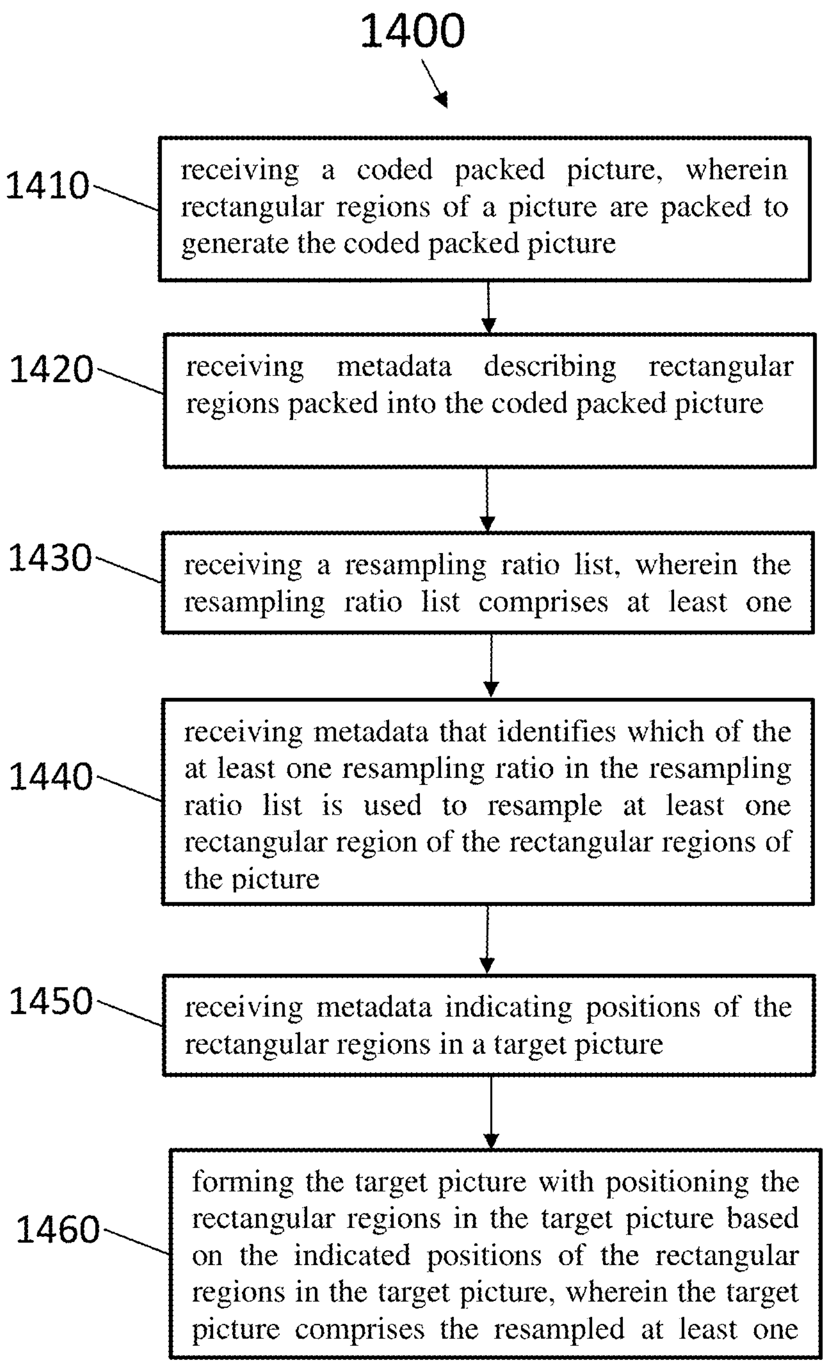
FIG. 14 is an example method, based on the examples described herein.

FIG. 14 is an example method 1400, based on the examples described herein. At 1410, the method includes receiving a coded packed picture, wherein rectangular regions of a picture are packed to generate the coded packed picture. At 1420, the method includes receiving metadata describing rectangular regions packed into the coded packed picture. At 1430, the method includes receiving a resampling ratio list, wherein the resampling ratio list comprises at least one resampling ratio. At 1440, the method includes receiving metadata that identifies which of the at least one resampling ratio in the resampling ratio list is used to resample at least one rectangular region of the rectangular regions of the picture. At 1450, the method includes receiving metadata indicating positions of the rectangular regions in a target picture. At 1460, the method includes forming the target picture with positioning the rectangular regions in the target picture based on the indicated positions of the rectangular regions in the target picture, wherein the target picture comprises the resampled at least one rectangular region.

Method 1400 may be performed with apparatus 50, decoder 640, apparatus 700, decoder 1000 using region packing 1030, or decoder 4.

Figure 15:
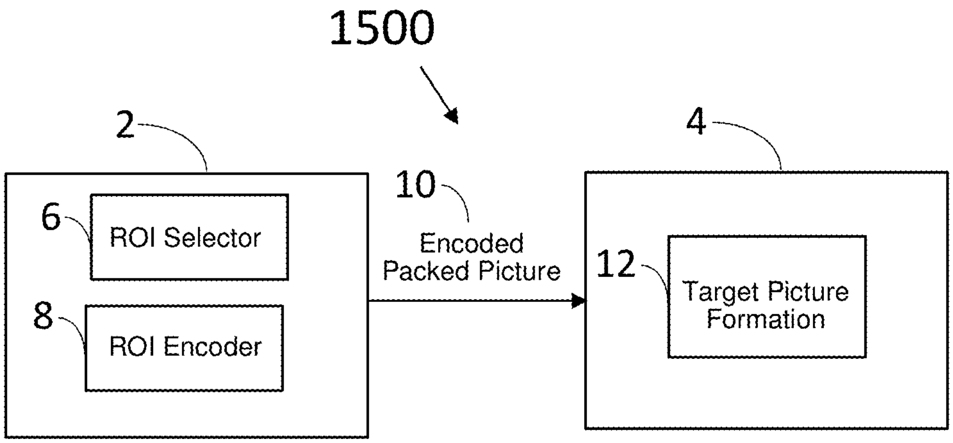
FIG. 15 is a block diagram of coding and decoding process, based on the examples described herein.

FIG. 15 is a block diagram of coding and decoding process, based on the examples described herein. FIG. 15 shows encoder 2 having an ROI selector 6 and an ROI encoder 8, which encoded a packed picture. The encoder 2 transmits the encoded packed picture 10 to the decoder 4, which forms a target picture from the encoded packed picture 10 using the target picture formation circuitry 12.

The following examples are provided and described herein.

Example 1. An apparatus including: at least one processor; and at least one memory storing instructions that, when executed by the at least one processor, cause the apparatus at least to: determine rectangular regions of a picture; pack the rectangular regions of the picture into a packed picture; code the packed picture; signal the coded packed picture; and signal metadata describing the rectangular regions packed into the coded packed picture.

Example 2. The apparatus of example 1, wherein the instructions, when executed by the at least one processor, cause the apparatus at least to: resample at least one rectangular region of the picture to have a resolution that is different from the original resolution of the at least one rectangular region of the picture; wherein the coded packed picture comprises the resampled at least one rectangular region of the picture.

Example 3. The apparatus of example 2, wherein: at least one other rectangular region of the packed picture has a resolution that is the same or substantially the same as an original resolution of the at least one other rectangular region of the packed picture; and the resolution of the at least one other rectangular region of the packed picture is the same or substantially the same as a resolution of the picture.

Example 4. The apparatus of example 3, wherein: the metadata is configured to be used to form a target picture comprising the rectangular regions of the picture; the target picture comprises the resampled at least one rectangular region of the picture having the resolution that is different from the original resolution of the at least one rectangular region of the picture; and the resolution of the resampled at least one rectangular region of the target picture is different from a resolution of at least one other rectangular region of the target picture.

Example 5. The apparatus of any of examples 1 to 4, wherein the instructions, when executed by the at least one processor, cause the apparatus at least to: signal a resampling ratio used to resample the at least one rectangular region of the picture.

Example 6. The apparatus of any of examples 1 to 5, wherein the instructions, when executed by the at least one processor, cause the apparatus at least to: signal a resampling ratio list, wherein the resampling ratio list comprises at least one resampling ratio; signal metadata that identifies which of the at least one resampling ratio in the list is used to resample at least one rectangular region of the rectangular regions of the picture.

Example 7. The apparatus of example 6, wherein the at least one resampling ratio comprises a ratio of integers.

Example 8. The apparatus of any of examples 6 to 7, wherein the instructions, when executed by the at least one processor, cause the apparatus at least to: signal a fixed aspect ratio indication, wherein the fixed aspect ratio indication indicates that the at least one resampling ratio is used for both a width and a height of the at least one rectangular region, without signaling separate resampling ratios for the width or height of the at least one rectangular region.

Example 9. The apparatus of any of examples 6 to 8, wherein the instructions, when executed by the at least one processor, cause the apparatus at least to: signal that a fixed aspect ratio is not indicated, wherein separate resampling ratios are signaled for both a width and a height of the at least one rectangular region.

Example 10. The apparatus of any of examples 6 to 9, wherein an index of the metadata is used to identify which of the at least one resampling ratio in the list is used to resample the at least one rectangular region of the rectangular regions of the picture, based on the at least one resampling ratio in the list being referenced with the index, and the at least one rectangular region being referenced with the index.

Example 11. The apparatus of example 10, wherein the index references the at least one resampling ratio in an array used to store the at least one resampling ratio, and the index references the at least one rectangular region in an array used to store the at least one rectangular region.

Example 12. The apparatus of any of examples 1 to 11, wherein the instructions, when executed by the at least one processor, cause the apparatus at least to: signal a position and a size of a rectangular region; use adaptive picture resolution coding when coding the packed picture; signal a maximum picture dimensions and a current picture dimensions; and signal a flag that indicates whether the position and the size of the rectangular region are with respect to the maximum picture dimensions or with respect to the current picture dimensions.

Example 13. The apparatus of any of examples 1 to 12, wherein the instructions, when executed by the at least one processor, cause the apparatus at least to: signal a unit size indicating a number of luma samples; and signal, for a rectangular region of the picture, a top left position of the rectangular region in units, and a width and height of the rectangular region in the units.

Example 14. The apparatus of example 13, wherein the unit size is signaled as a power of 2.

Example 15. The apparatus of any of examples 1 to 14, wherein the instructions, when executed by the at least one processor, cause the apparatus at least to: signal a top left location of the rectangular regions within a target picture formed from the coded packed picture; wherein the signaling of the top left location of the rectangular regions within the target picture is configured to be used to form the target picture from the coded packed picture; wherein a size of the rectangular regions within the target picture is not signaled and inferred from a resampling ratio.

Example 16. The apparatus of any of examples 1 to 15, wherein the instructions, when executed by the at least one processor, cause the apparatus at least to: determine a first rectangular region of the picture that does not comprise the entire picture; and determine a second rectangular region of the picture that comprises the entire picture.

Example 17. The apparatus of example 16, wherein the instructions, when executed by the at least one processor, cause the apparatus at least to: replace in the second region sample values that correspond to a location of the first region with a single color value.

Example 18. The apparatus of any of examples 16 to 17, wherein the instructions, when executed by the at least one processor, cause the apparatus at least to: downsample the second rectangular region; and pack the downsampled second rectangular region into the packed picture.

Example 19. The apparatus of any of examples 1 to 18, wherein the metadata describing the rectangular regions packed into the coded packed picture is signaled as a packed regions supplemental enhancement information message.

Example 20. The apparatus of example 19, wherein the instructions, when executed by the at least one processor, causes the apparatus at least to: signal a processing order supplemental enhancement information message which refers to the packed regions supplemental enhancement information message and to a postprocessing stage; wherein the metadata is configured to be used to form a target picture comprising the rectangular regions of the picture, and the postprocessing stage is subsequent to the formation of the target picture and takes the target picture as input.

Example 21. The apparatus of any of examples 1 to 20, wherein the rectangular regions of the picture are regions of interest.

Example 22. The apparatus of any of examples 1 to 21, wherein: the metadata is configured to be used to form a target picture comprising the rectangular regions of the picture; the target picture comprises at least one rectangular region having a resolution that is not the same as an original resolution of the at least one rectangular region of the picture; and the resolution of the at least one rectangular region of the target picture is not the same as an original resolution of at least one other rectangular region of the target picture.

Example 23. The apparatus of any of examples 1 to 22, wherein the coding of the packed picture comprises including at least one rectangular region of the picture that is not among regions of interest into the packed picture, wherein the at least one rectangular region of the picture that is not among the regions of interest included into the packed picture has a resolution that is lower than an original resolution of the at least one rectangular region of the picture that is not among the regions of interest.

Example 24. The apparatus of example 23, wherein the at least one rectangular region of the picture that is not among the regions of interest coded into the packed picture comprises a rectangular background region.

Example 25. The apparatus of example 24, wherein the rectangular background region comprises the regions of interest.

Example 26. The apparatus of any of examples 1 to 25, wherein the instructions, when executed by the at least one processor, cause the apparatus at least to: signal a resolution of a target picture comprising the rectangular regions of the picture, wherein the signaled resolution is configured to be used to form the target picture from the coded packed picture.

Example 27. The apparatus of any of examples 1 to 26, wherein the instructions, when executed by the at least one processor, cause the apparatus at least to: signal a top left location of rectangular regions within a target picture comprising the rectangular regions of the picture, wherein the signaling of the top left location of the rectangular regions is configured to be used to form the target picture from the coded packed picture.

Example 28. The apparatus of any of examples 1 to 27, wherein the instructions, when executed by the at least one processor, cause the apparatus at least to: signal a persistence flag that specifies a persistence of a packed rectangular regions information supplemental enhancement information message for a current layer; wherein a value of 0 for the persistence flag specifies that the packed rectangular regions information supplemental enhancement information message applies to a current decoded picture only; wherein a value of 1 for the persistence flag specifies that the packed rectangular regions information supplemental enhancement information message applies to the current decoded picture and persists for all subsequent pictures of the current layer in output order until one or more of the following conditions are true: a new coded layer video sequence of the current layer begins, the bitstream ends, or a picture in the current layer in an access unit associated with a packed rectangular regions information supplemental enhancement information message is output that follows the current picture in output order.

Example 29. The apparatus of any of examples 1 to 28, wherein the instructions, when executed by the at least one processor, cause the apparatus at least to: signal a cancel flag, wherein a value of 1 for the cancel flag indicates that a supplemental enhancement information message cancels the persistence of any previous packed rectangular regions information supplemental enhancement information message in output order that applies to a current layer, and a value of 0 for the cancel flag indicates that packed rectangular regions information follows.

Example 30. The apparatus of any of examples 1 to 29, wherein sample values are initialized to a single color value during a forming of a target picture comprising the rectangular regions of the picture from the coded packed picture.

Example 31. The apparatus of any of examples 1 to 30, wherein at least two rectangular regions of the rectangular regions of the picture overlap within a target picture comprising the rectangular regions of the picture formed from the coded packed picture.

Example 32. The apparatus of example 31, wherein the instructions, when executed by the at least one processor, cause the apparatus at least to: signal a precedence for at least one or more of a first rectangular region or a second rectangular region in the target picture formed from the coded packed picture, based on a region identifier or a signaling order of the rectangular regions of the picture or the coded packed picture; wherein the first rectangular region overlaps the second rectangular region in the target picture in an overlapping area of the target picture; wherein the precedence for at least one or more of the first rectangular region or the second rectangular region indicates whether the first rectangular region replaces the second rectangular region in the overlapping area of the target picture.

Example 33. The apparatus of any of examples 1 to 32, wherein the instructions, when executed by the at least one processor, cause the apparatus at least to: signal region identifiers of the rectangular regions.

Example 34. An apparatus including: at least one processor; and at least one memory storing instructions that, when executed by the at least one processor, cause the apparatus at least to: receive signaling of a coded packed picture; and receive signaling of metadata describing rectangular regions packed into the coded packed picture.

Example 35. The apparatus of example 34, wherein the instructions, when executed by the at least one processor, cause the apparatus at least to: receive metadata indicating positions of the rectangular regions in a target picture.

Example 36. The apparatus of example 35, wherein the instructions, when executed by the at least one processor, cause the apparatus at least to: form a target picture with positioning the rectangular regions in the target picture based on the indicated positions of the rectangular regions in the target picture.

Example 37. The apparatus of any of examples 34 to 36, wherein the instructions, when executed by the at least one processor, cause the apparatus at least to: receive metadata that indicates a resampling ratio of a resampled at least one rectangular region of the coded packed picture.

Example 38. The apparatus of any of examples 34 to 37, wherein the instructions, when executed by the at least one processor, cause the apparatus at least to: receive metadata indicating positions of the rectangular regions in a target picture; receive metadata that indicates a resampling ratio of a resampled at least one rectangular region of the coded packed picture; resample the at least one rectangular region based on the resampling ratio of the resampled at least one rectangular region of the coded packed picture to generate a resampled rectangular region; form a target picture with positioning the rectangular regions in the target picture based on the indicated positions of the rectangular regions in the target picture, wherein the target picture comprises the resampled at least one rectangular region.

Example 39. The apparatus of example 38, wherein the resampled at least one rectangular region in the target picture has a resolution that is different from an original resolution of the at least one rectangular region of the picture.

Example 40. The apparatus of any of examples 34 to 39, wherein the instructions, when executed by the at least one processor, cause the apparatus at least to: receive signaling of a resampling ratio list, wherein the resampling ratio list comprises at least one resampling ratio; and receive signaling of metadata that identifies which of the at least one resampling ratio in the list is used to resample at least one rectangular region of the rectangular regions of the coded packed picture.

Example 41. The apparatus of example 40, wherein the at least one resampling ratio comprises a ratio of integers.

Example 42. The apparatus of any of examples 40 to 41, wherein the instructions, when executed by the at least one processor, cause the apparatus at least to: receive metadata indicating positions of the rectangular regions in a target picture; resample the at least one rectangular region based on the at least one resampling ratio in the resampling ratio list to generate a resampled rectangular region; and form a target picture with positioning the rectangular regions in the target picture based on the indicated positions of the rectangular regions in the target picture, wherein the target picture comprises the resampled rectangular region.

Example 43. The apparatus of any of examples 40 to 42, wherein the at least one resampling ratio comprises a ratio of integers.

Example 44. The apparatus of any of examples 40 to 43, wherein the instructions, when executed by the at least one processor, cause the apparatus at least to: receive signaling of a fixed aspect ratio indication, wherein the fixed aspect ratio indication indicates that the at least one resampling ratio is used for both a width and a height of the at least one rectangular region, without signaling separate resampling ratios for the width or height of the at least one rectangular region.

Example 45. The apparatus of any of examples 40 to 44, wherein the instructions, when executed by the at least one processor, cause the apparatus at least to: signal that a fixed aspect ratio is not indicated, wherein separate resampling ratios are signaled for both a width and a height of the at least one rectangular region.

Example 46. The apparatus of any of examples 40 to 45, wherein an index of the metadata is used to identify which of the at least one resampling ratio in the list is used to resample the at least one rectangular region of the rectangular regions of the coded packed picture, based on the at least one resampling ratio in the list being referenced with the index, and the at least one rectangular region being referenced with the index.

Example 47. The apparatus of example 46, wherein the index references the at least one resampling ratio in an array used to store the at least one resampling ratio, and the index references the at least one rectangular region in an array used to store the at least one rectangular region.

Example 48. The apparatus of any of examples 34 to 47, wherein the instructions, when executed by the at least one processor, cause the apparatus at least to: receive signaling of a position and a size of a rectangular region; wherein adaptive picture resolution coding is used to code the coded packed picture; receive signaling of a maximum picture dimensions and a current picture dimensions; and receive signaling of a flag that indicates whether the position and the size of the rectangular region are with respect to the maximum picture dimensions or with respect to the current picture dimensions.

Example 49. The apparatus of example 48, wherein the instructions, when executed by the at least one processor, cause the apparatus at least to: receive signaling of a unit size; in response to the flag indicating that the position and size of the rectangular region are with respect to the current picture dimensions: determine a position of a luma sample in the rectangular region to be a top left position of the rectangular region in units multiplied with the unit size, and determine a width and height of the luma sample in the rectangular region to be a width and height of the rectangular region in the units multiplied with the unit size; and in response to the flag indicating that the position and the size of the rectangular region are with respect to the maximum picture dimensions: determine the position of the luma sample in the rectangular region based on the maximum picture dimensions, and determine the width and height of the luma sample in the rectangular region based on the maximum picture dimensions and dimensions of the coded packed picture.

Example 50. The apparatus of any of examples 35 to 48, wherein the instructions, when executed by the at least one processor, cause the apparatus at least to: receive signaling of a unit size; determine a position of a luma sample in the rectangular region to be a top left position of the rectangular region in units multiplied with the unit size, and determine a width and height of the luma sample in the rectangular region to be a width and height of the rectangular region in the units multiplied with the unit size.

Example 51. The apparatus of any of examples 34 to 50, wherein the instructions, when executed by the at least one processor, cause the apparatus at least to: receive signaling of a unit size indicating a number of luma samples.

Example 52. The apparatus of example 51, wherein the instructions, when executed by the at least one processor, cause the apparatus at least to: receive signaling of, for a rectangular region of the coded packed picture, a top left horizontal position of the rectangular region of the coded packed picture in units, and a top left vertical position of the rectangular region of the coded packed picture in the units; determine a top left horizontal position of the rectangular region in a target picture to be, in response to maximum picture dimensions not being used: the top left horizontal position of the rectangular region of the coded packed picture in the units multiplied with the unit size; determine a top left vertical position of the rectangular region in the target picture to be, in response to maximum picture dimensions not being used: the top left vertical position of the rectangular region of the coded packed picture in the units multiplied with the unit size; determine the top left horizontal position of the rectangular region in the target picture to be, in response to maximum picture dimensions being used: the top left horizontal position of the rectangular region of the coded packed picture in the units multiplied with the unit size multiplied with a picture width in luma samples added to a maximum picture width divided by 2, divided by the maximum picture width; and determine the top left vertical position of the rectangular region in the target picture to be, in response to maximum picture dimensions being used: the top left vertical position of the rectangular region of the coded packed picture in the units multiplied with the unit size multiplied with a picture height in luma samples added to a maximum picture height divided by 2, divided by the maximum picture height.

Example 53. The apparatus of any of examples 50 to 52, wherein the unit size is signaled as a power of 2.

Example 54. The apparatus of any of examples 34 to 53, wherein the instructions, when executed by the at least one processor, cause the apparatus at least to: receive signaling of a top left location of the rectangular regions within a target picture; form the target picture from the coded packed picture, based on the signaling of the top left location of the rectangular regions within the target picture; wherein a size of the rectangular regions within the target picture is not signaled; and infer the size of the rectangular regions within the target picture from a resampling ratio.

Example 55. The apparatus of any of examples 34 to 54, wherein: a first rectangular region of the coded packed picture does not comprise an entire picture; and a second rectangular region of the coded packed picture comprises the entire picture.

Example 56. The apparatus of example 55, wherein the second rectangular region is downsampled into the coded packed picture.

Example 57. The apparatus of any of examples 34 to 56, wherein the coded packed picture comprises a resampled at least one rectangular region, wherein the resampled at least one rectangular region of the picture has a resolution that is different from the original resolution of the at least one rectangular region of the picture.

Example 58. The apparatus of any of examples 34 to 57, wherein the metadata describing the rectangular regions packed into the coded packed picture is received as a packed rectangular regions supplemental enhancement information message.

Example 59. The apparatus of example 58, wherein: a processing order supplemental enhancement information message is received that refers to the to the packed rectangular regions supplemental enhancement information message and to a postprocessing stage; a target picture is reconstructed; and the target picture is input to the post processing stage.

Example 60. The apparatus of any of examples 34 to 59, wherein the rectangular regions of the picture are regions of interest.

Example 61. The apparatus of any of examples 34 to 60, wherein at least one rectangular region of the coded packed picture has a resolution that is different from an original resolution of the at least one rectangular region of a picture.

Example 62. The apparatus of example 61, wherein: at least one other rectangular region of the coded packed picture has a resolution that is the same or substantially the same as an original resolution of the at least one other rectangular region of the coded packed picture; and the resolution of the at least one other rectangular region of the packed picture is the same or substantially the same as a resolution of the picture.

Example 63. The apparatus of example 62, wherein: the metadata is configured to be used to form a target picture comprising the rectangular regions of the picture; the target picture comprises the at least one rectangular region of the coded packed picture having the resolution that is different from the original resolution of the at least one rectangular region of the picture; the target picture comprises the at least one other rectangular region; and the resolution of the at least one rectangular region of the target picture is different from a resolution of the at least one other rectangular region of the target picture.

Example 64. The apparatus of any of examples 34 to 63, wherein the coded packed picture comprises at least one rectangular region that is not among regions of interest, wherein the at least one rectangular region that is not among the regions of interest included into the packed picture has a resolution that is lower than an original resolution of the at least one rectangular region that is not among the regions of interest.

Example 65. The apparatus of example 64, wherein the at least one rectangular region of the picture that is not among the regions of interest coded into the packed picture comprises a rectangular background region.

Example 66. The apparatus of example 65, wherein the rectangular background region comprises the regions of interest.

Example 67. The apparatus of any of examples 34 to 66, wherein the instructions, when executed by the at least one processor, cause the apparatus at least to: receive signaling of a resolution of a target picture comprising the rectangular regions, wherein the signaled resolution is configured to be used to form the target picture from the coded packed picture.

Example 68. The apparatus of any of examples 34 to 67, wherein the instructions, when executed by the at least one processor, cause the apparatus at least to: receive signaling of a top left location of rectangular regions within a target picture comprising the rectangular regions, wherein the signaling of the top left location of the rectangular regions is configured to be used to form the target picture from the coded packed picture.

Example 69. The apparatus of any of examples 34 to 68, wherein the instructions, when executed by the at least one processor, cause the apparatus at least to: receive signaling of a persistence flag that specifies a persistence of a packed rectangular regions information supplemental enhancement information message for a current layer; wherein a value of 0 for the persistence flag specifies that the packed rectangular regions information supplemental enhancement information message applies to a current decoded picture only; wherein a value of 1 for the persistence flag specifies that the packed rectangular regions information supplemental enhancement information message applies to the current decoded picture and persists for all subsequent pictures of the current layer in output order until one or more of the following conditions are true: a new coded layer video sequence of the current layer begins, the bitstream ends, or a picture in the current layer in an access unit associated with a packed rectangular regions information supplemental enhancement information message is output that follows the current picture in output order.

Example 70. The apparatus of any of examples 34 to 69, wherein the instructions, when executed by the at least one processor, cause the apparatus at least to: receive signaling of a cancel flag, wherein a value of 1 for the cancel flag indicates that a supplemental enhancement information message cancels the persistence of any previous packed rectangular regions information supplemental enhancement information message in output order that applies to a current layer, and a value of 0 for the cancel flag indicates that packed rectangular regions information follows.

Example 71. The apparatus of any of examples 34 to 70, wherein sample values are initialized to a single color value during a forming of a target picture comprising the rectangular regions from the coded packed picture.

Example 72. The apparatus of any of examples 34 to 71, wherein at least two rectangular regions of the rectangular regions overlap within a target picture comprising the rectangular regions formed from the coded packed picture.

Example 73. The apparatus of example 72, wherein the instructions, when executed by the at least one processor, cause the apparatus at least to: receive signaling of a precedence for at least one or more of a first rectangular region or a second rectangular region in the target picture formed from the coded packed picture, based on a region identifier or a signaling order of the rectangular regions of the coded packed picture; wherein the first rectangular region overlaps the second rectangular region in the target picture in an overlapping area of the target picture; wherein the precedence for at least one or more of the first rectangular region or the second rectangular region indicates whether the first rectangular region replaces the second rectangular region in the overlapping area of the target picture.

Example 74. The apparatus of any of examples 34 to 73, wherein the instructions, when executed by the at least one processor, cause the apparatus at least to: receive signaling of region identifiers of the rectangular regions.

Example 75. A method including: determining rectangular regions of a picture; packing the rectangular regions of the picture into a packed picture; coding the packed picture; signaling the coded packed picture; and signaling metadata describing the rectangular regions packed into the coded packed picture.

Example 76. A method including: receiving signaling of a coded packed picture; and receiving signaling of metadata describing rectangular regions packed into the coded packed picture.

Example 77. An apparatus including: means for determining rectangular regions of a picture; means for packing the rectangular regions of the picture into a packed picture; means for coding the packed picture; means for signaling the coded packed picture; and means for signaling metadata describing the rectangular regions packed into the coded packed picture.

Example 78. An apparatus including: means for receiving signaling of a coded packed picture; and means for receiving signaling of metadata describing rectangular regions packed into the coded packed picture.

Example 79. A computer readable medium including instructions stored thereon for performing at least the following: determining rectangular regions of a picture; packing the rectangular regions of the picture into a packed picture; coding the packed picture; signaling the coded packed picture; and signaling metadata describing the rectangular regions packed into the coded packed picture.

Example 80. A computer readable medium including instructions stored thereon for performing at least the following: receiving signaling of a coded packed picture; and receiving signaling of metadata describing rectangular regions packed into the coded packed picture.

Example 81. An apparatus comprising: at least one processor; and at least one memory storing instructions that, when executed by the at least one processor, cause the apparatus at least to: determine rectangular regions of a picture; pack the rectangular regions of the picture into a packed picture; code the packed picture to generate a coded packed picture; signal the coded packed picture; signal metadata describing the rectangular regions packed into the coded packed picture; signal a resampling ratio list, wherein the resampling ratio list comprises at least one resampling ratio; signal metadata that identifies which of the at least one resampling ratio in the resampling ratio list is used to resample at least one rectangular region of the rectangular regions of the picture; and signal metadata indicating positions of the rectangular regions in a target picture.

Example 82. The apparatus of example 81, wherein the instructions, when executed by the at least one processor, cause the apparatus at least to: signal an aspect ratio indicator, wherein the aspect ratio indicator comprising a first value indicates that numerator and denominator syntax elements used for determining at least one resampling ratio of the at least one rectangular region are not present, and wherein the aspect ratio indicator comprising a second value indicates that the numerator and denominator syntax elements used for determining at the least one resampling ratio of the at least one rectangular region are present.

Example 83. The apparatus of example 81, wherein the apparatus is further caused to: define an index for referencing: the at least one resampling ratio in an array used for storing the at least one resampling ratio and/or for referencing the at least one rectangular region in an array used for storing the at least one rectangular region.

Example 84. The apparatus of example 81, wherein the instructions, when executed by the at least one processor, cause the apparatus at least to: signal a position and a size of a rectangular region; use adaptive picture resolution coding when coding the packed picture; signal a maximum picture dimensions and a current picture dimensions; and signal an indicator that indicates whether the position and the size of the rectangular region are with respect to the maximum picture dimensions or with respect to the current picture dimensions.

Example 85. The apparatus of example 81, wherein the instructions, when executed by the at least one processor, cause the apparatus at least to: signal a unit size indicating a number of luma samples; signal, for a rectangular region of the picture, a top left position of the rectangular region in units, and a width and height of the rectangular region in the units; and signal a top left location of the rectangular regions within the target picture formed from the coded packed picture, wherein the top left location of the rectangular regions within the target picture is intended to be used to form the target picture from the coded packed picture, wherein a size of the rectangular regions within the target picture is not signaled and inferred from a resampling ratio.

Example 86. An apparatus comprising: at least one processor; and at least one memory storing instructions that, when executed by the at least one processor, cause the apparatus at least to: receive a coded packed picture, wherein rectangular regions of a picture are packed to generate the coded packed picture; receive metadata describing the rectangular regions packed into the coded packed picture; receive a resampling ratio list, wherein the resampling ratio list comprises at least one resampling ratio;

receive metadata that identifies which of the at least one resampling ratio in the resampling ratio list is used to resample at least one rectangular region of the rectangular regions of the picture; receive metadata indicating positions of the rectangular regions in a target picture; and form the target picture with positioning the rectangular regions in the target picture based on the indicated positions of the rectangular regions in the target picture, wherein the target picture comprises the resampled at least one rectangular region.

Example 87. The apparatus of example 86, wherein the instructions, when executed by the at least one processor, cause the apparatus at least to: receive an aspect ratio indicator, wherein the aspect ratio indicator comprising a first value indicates that numerator and denominator syntax elements used for determining at least one resampling ratio of the at least one rectangular region are not present, and wherein the aspect ratio indicator comprising a second value indicates that the numerator and denominator syntax elements used for determining at the least one resampling ratio of the at least one rectangular region are present.

Example 88. The apparatus of example 86, wherein the apparatus is further caused to: receive an index for referencing: the at least one resampling ratio in an array used for storing the at least one resampling ratio; and/or the at least one rectangular region in an array used for storing the at least one rectangular region.

Example 89. The apparatus of example 86, wherein the instructions, when executed by the at least one processor, cause the apparatus at least to: receive a position and a size of a rectangular region; wherein adaptive picture resolution coding is used to code the coded packed picture; receive a maximum picture dimensions and a current picture dimensions; and receive an indicator that indicates whether the position and the size of the rectangular region are with respect to the maximum picture dimensions or with respect to the current picture dimensions.

Example 90. The apparatus of example 89, wherein the instructions, when executed by the at least one processor, cause the apparatus at least to: receive a unit size; in response to the indicator indicating that the position and size of the rectangular region are with respect to the current picture dimensions: determine a position of a luma sample in the rectangular region to be a top left position of the rectangular region in units multiplied with the unit size, and determine a width and height of the luma sample in the rectangular region to be a width and height of the rectangular region in the units multiplied with the unit size; in response to the indicator indicating that the position and the size of the rectangular region are with respect to the maximum picture dimensions: determine the position of the luma sample in the rectangular region based on the maximum picture dimensions, and determine the width and height of the luma sample in the rectangular region based on the maximum picture dimensions and dimensions of the coded packed picture; and determine the position of the luma sample in the rectangular region to be the top left position of the rectangular region in the units multiplied with the unit size, and determine the width and height of the luma sample in the rectangular region to be a width and height of the rectangular region in the units multiplied with the unit size.

Example 91. A method comprising: determining rectangular regions of a picture; packing the rectangular regions of the picture into a packed picture; coding the packed picture for generating a coded packed picture; signaling the coded packed picture; signaling metadata describing the rectangular regions packed into the coded packed picture; signaling a resampling ratio list, wherein the resampling ratio list comprises at least one resampling ratio; and signaling metadata that identifies which of the at least one resampling ratio in the resampling ratio list is used to resample at least one rectangular region of the rectangular regions of the picture; and signaling metadata indicating positions of the rectangular regions in a target picture.

Example 92. The method of example 91 further comprising: signaling an aspect ratio indicator, wherein the aspect ratio indicator comprising a first value indicates that numerator and denominator syntax elements used for determining at least one resampling ratio of the at least one rectangular region are not present, and wherein the aspect ratio indicator comprising a second value indicates that the numerator and denominator syntax elements used for determining at the least one resampling ratio of the at least one rectangular region are present.

Example 93. The method of example 91 further comprising: defining an index for referencing: the at least one resampling ratio in an array used for storing the at least one resampling ratio and/or for referencing the at least one rectangular region in an array used for storing the at least one rectangular region.

Example 94. The method of example 91 further comprising: signaling a position and a size of a rectangular region; using adaptive picture resolution coding when coding the packed picture; signaling a maximum picture dimensions and a current picture dimensions; and signaling an indicator that indicates whether the position and the size of the rectangular region are with respect to the maximum picture dimensions or with respect to the current picture dimensions.

Example 95. The method of example 91 further comprising: signaling a unit size indicating a number of luma samples; signaling, for a rectangular region of the picture, a top left position of the rectangular region in units, and a width and height of the rectangular region in the units; and signaling a top left location of the rectangular regions within the target picture formed from the coded packed picture, wherein the top left location of the rectangular regions within the target picture is intended to be used to form the target picture from the coded packed picture, wherein a size of the rectangular regions within the target picture is not signaled and inferred from a resampling ratio.

Example 96. A method comprising: receiving a coded packed picture, wherein rectangular regions of a picture are packed to generate the coded packed picture; and receiving metadata describing rectangular regions packed into the coded packed picture; receiving a resampling ratio list, wherein the resampling ratio list comprises at least one resampling ratio; receiving metadata that identifies which of the at least one resampling ratio in the resampling ratio list is used to resample at least one rectangular region of the rectangular regions of the picture; receiving metadata indicating positions of the rectangular regions in a target picture; and forming the target picture with positioning the rectangular regions in the target picture based on the indicated positions of the rectangular regions in the target picture, wherein the target picture comprises the resampled at least one rectangular region.

Example 97. The method of example 96 further comprising: receiving an aspect ratio indicator, wherein the aspect ratio indicator comprising a first value indicates that numerator and denominator syntax elements used for determining at least one resampling ratio of the at least one rectangular region are not present, and wherein the aspect ratio indicator comprising a second value indicates that the numerator and denominator syntax elements used for determining at the least one resampling ratio of the at least one rectangular region are present.

Example 98. The method of example 96 further comprising: receiving an index for referencing the at least one resampling ratio in an array used for storing the at least one resampling ratio and/or the at least one rectangular region in an array used for storing the at least one rectangular region.

Example 99. The method of example 96 further comprising: receiving a position and a size of a rectangular region; wherein adaptive picture resolution coding is used to code the coded packed picture; receiving a maximum picture dimensions and a current picture dimensions; and receiving an indicator that indicates whether the position and the size of the rectangular region are with respect to the maximum picture dimensions or with respect to the current picture dimensions.

Example 100. The method of example 99 further comprising: receiving a unit size; in response to the indicator indicating that the position and size of the rectangular region are with respect to the current picture dimensions: determining a position of a luma sample in the rectangular region to be a top left position of the rectangular region in units multiplied with the unit size, and determine a width and height of the luma sample in the rectangular region to be a width and height of the rectangular region in the units multiplied with the unit size; in response to the indicator indicating that the position and the size of the rectangular region are with respect to the maximum picture dimensions: determining the position of the luma sample in the rectangular region based on the maximum picture dimensions, and determine the width and height of the luma sample in the rectangular region based on the maximum picture dimensions and dimensions of the coded packed picture; and determining the position of the luma sample in the rectangular region to be the top left position of the rectangular region in the units multiplied with the unit size, and determine the width and height of the luma sample in the rectangular region to be a width and height of the rectangular region in the units multiplied with the unit size.

References to a 'computer', 'processor', etc. should be understood to encompass not only computers having different architectures such as single/multi-processor architectures and sequential/parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, etc.

As used herein, the term 'circuitry', 'circuit' and variants may refer to any of the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and one or more memories that work together to cause an apparatus to perform various functions, and (c) circuits, such as a microprocessor(s) or a portion of a microprocessor(s), that require software or firmware for operation, even when the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and when applicable to the particular element, a baseband integrated circuit or applications processor integrated circuit for a mobile phone or a similar integrated circuit in a server, a cellular network device, or another network device. Circuitry or circuit may also be used to mean a function or a process used to execute a method.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

The following acronyms and abbreviations that may be found in the specification and/or the drawing figures are defined as follows (the abbreviations may be appended with each other or with other characters using e.g. a hyphen, dash (-), or number (or abbreviations having a character may be the same with a character removed), and may be case insensitive):

ASIC application specific integrated circuit
AU access unit
AVC advanced video coding
CLVS coded layer video sequence
CPU central processing unit
Exp exponential
FPGA field programmable gate array
H.2xx family of video coding standards in the domain of the ITU-T (e.g. H.264, H.265, H.266, H.274)
HEVC high efficiency video coding
HMD head-mounted display
ID identifier
Idc indicator
I/F interface
I/O input/output
ITU International Telecommunication Union
ITU-T ITU Telecommunication Standardization Sector
NNPF neural-network post-processing filter or neural network post filter
N/W network
PON processing order nesting
PPS picture parameter set
pri packed regions information
RAM random access memory
RFM reference frame memory
ROI region of interest
ROM read only memory
SEI supplemental enhancement information
SON self-organizing/optimizing network
SPO SEI processing order
SPS sequence parameter set
ue(v) unsigned integer Exp-Golomb-coded syntax element with the left bit first
UI user interface
u(n) unsigned integer using n bits (e.g. u(4))
USB universal serial bus
u(v) unsigned integer using a variable number of bits
VCM video coding for machines
VSEI versatile supplemental enhancement information
VVC versatile video coding

What is claimed is:

1. An apparatus comprising:
at least one processor; and
at least one memory storing instructions that, when executed by the at least one processor, cause the apparatus at least to:
determine rectangular regions of a picture;
pack the rectangular regions of the picture into a packed picture;
code the packed picture to generate a coded packed picture;
signal the coded packed picture;
signal metadata describing the rectangular regions packed into the coded packed picture;
signal a resampling ratio list, wherein the resampling ratio list comprises at least one resampling ratio;
signal metadata that identifies which of the at least one resampling ratio in the resampling ratio list is used to resample at least one rectangular region of the rectangular regions of the picture;
signal metadata indicating positions of the rectangular regions in a target picture;
signal a unit size indicating a number of luma samples;
signal, for a rectangular region of the picture, a top left position of the rectangular region in units, and a width and height of the rectangular region in the units; and
signal a top left location of the rectangular regions within the target picture formed from the coded packed picture, wherein the top left location of the rectangular regions within the target picture is intended to be used to form the target picture from the coded packed picture, wherein a size of the rectangular regions within the target picture is not signaled and inferred from a resampling ratio.

2. The apparatus of claim 1, wherein the instructions, when executed by the at least one processor, cause the apparatus at least to:
signal an aspect ratio indicator, wherein the aspect ratio indicator comprising a first value indicates that numerator and denominator syntax elements used for determining at least one resampling ratio of the at least one rectangular region are not present, and wherein the aspect ratio indicator comprising a second value indicates that the numerator and denominator syntax elements used for determining at the least one resampling ratio of the at least one rectangular region are present.

3. The apparatus of claim 1, wherein the apparatus is further caused to: define an index for referencing: the at least one resampling ratio in an array used for storing the at least one resampling ratio and/or for referencing the at least one rectangular region in an array used for storing the at least one rectangular region.

4. The apparatus of claim 1, wherein the instructions, when executed by the at least one processor, cause the apparatus at least to:
signal a position and a size of a rectangular region;
use adaptive picture resolution coding when coding the packed picture;
signal a maximum picture dimensions and a current picture dimensions; and
signal an indicator that indicates whether the position and the size of the rectangular region are with respect to the maximum picture dimensions or with respect to the current picture dimensions.

5. An apparatus comprising:
at least one processor; and
at least one memory storing instructions that, when executed by the at least one processor, cause the apparatus at least to:
receive a coded packed picture, wherein rectangular regions of a picture are packed to generate the coded packed picture;
receive metadata describing the rectangular regions packed into the coded packed picture;
receive a resampling ratio list, wherein the resampling ratio list comprises at least one resampling ratio;
receive metadata that identifies which of the at least one resampling ratio in the resampling ratio list is used to resample at least one rectangular region of the rectangular regions of the picture;
receive metadata indicating positions of the rectangular regions in a target picture;
receive a unit size;
receive a unit size indicating a number of luma samples;
receive, for a rectangular region of the picture, a top left position of the rectangular region in units, and a width and height of the rectangular region in the units; and
receive a top left location of the rectangular regions within the target picture formed from the coded packed picture, wherein the top left location of the rectangular regions within the target picture is intended to be used to form the target picture from the coded packed picture, wherein a size of the rectangular regions within the target picture is not signaled and inferred from a resampling ratio; and
form the target picture with positioning the rectangular regions in the target picture based on the indicated positions of the rectangular regions in the target picture, wherein the target picture comprises the resampled at least one rectangular region.

6. The apparatus of claim 5, wherein the instructions, when executed by the at least one processor, cause the apparatus at least to:
receive an aspect ratio indicator, wherein the aspect ratio indicator comprising a first value indicates that numerator and denominator syntax elements used for determining at least one resampling ratio of the at least one rectangular region are not present, and wherein the aspect ratio indicator comprising a second value indicates that the numerator and denominator syntax elements used for determining at the least one resampling ratio of the at least one rectangular region are present.

7. The apparatus of claim 5, wherein the apparatus is further caused to: receive an index for referencing: the at least one resampling ratio in an array used for storing the at least one resampling ratio; and/or the at least one rectangular region in an array used for storing the at least one rectangular region.

8. The apparatus of claim 5, wherein the instructions, when executed by the at least one processor, cause the apparatus at least to:
receive a position and a size of a rectangular region;
wherein adaptive picture resolution coding is used to code the coded packed picture;
receive a maximum picture dimensions and a current picture dimensions; and
receive an indicator that indicates whether the position and the size of the rectangular region are with respect to the maximum picture dimensions or with respect to the current picture dimensions.

9. The apparatus of claim 8, wherein the instructions, when executed by the at least one processor, cause the apparatus at least to:

receive a unit size;

in response to the indicator indicating that the position and size of the rectangular region are with respect to the current picture dimensions: determine a position of a luma sample in the rectangular region to be a top left position of the rectangular region in units multiplied with the unit size, and determine a width and height of the luma sample in the rectangular region to be a width and height of the rectangular region in the units multiplied with the unit size;

in response to the indicator indicating that the position and the size of the rectangular region are with respect to the maximum picture dimensions: determine the position of the luma sample in the rectangular region based on the maximum picture dimensions, and determine the width and height of the luma sample in the rectangular region based on the maximum picture dimensions and dimensions of the coded packed picture; and determine the position of the luma sample in the rectangular region to be the top left position of the rectangular region in the units multiplied with the unit size, and determine the width and height of the luma sample in the rectangular region to be a width and height of the rectangular region in the units multiplied with the unit size.

10. A method comprising:

determining rectangular regions of a picture;

packing the rectangular regions of the picture into a packed picture;

coding the packed picture for generating a coded packed picture;

signaling the coded packed picture;

signaling metadata describing the rectangular regions packed into the coded packed picture;

signaling a resampling ratio list, wherein the resampling ratio list comprises at least one resampling ratio;

signaling metadata that identifies which of the at least one resampling ratio in the resampling ratio list is used to resample at least one rectangular region of the rectangular regions of the picture;

signaling metadata indicating positions of the rectangular regions in a target picture;

signaling a unit size indicating a number of luma samples;

signaling, for a rectangular region of the picture, a top left position of the rectangular region in units, and a width and height of the rectangular region in the units; and signaling a top left location of the rectangular regions within the target picture formed from the coded packed picture, wherein the top left location of the rectangular regions within the target picture is intended to be used to form the target picture from the coded packed picture, wherein a size of the rectangular regions within the target picture is not signaled and inferred from a resampling ratio.

11. The method of claim 10 further comprising:

signaling an aspect ratio indicator, wherein the aspect ratio indicator comprising a first value indicates that numerator and denominator syntax elements used for determining at least one resampling ratio of the at least one rectangular region are not present, and wherein the aspect ratio indicator comprising a second value indicates that the numerator and denominator syntax elements used for determining at the least one resampling ratio of the at least one rectangular region are present.

12. The method of claim 10 further comprising: defining an index for referencing: the at least one resampling ratio in an array used for storing the at least one resampling ratio and/or the for referencing the at least one rectangular region in an array used for storing the at least one rectangular region.

13. The method of claim 10 further comprising:

signaling a position and a size of a rectangular region;

using adaptive picture resolution coding when coding the packed picture;

signaling a maximum picture dimensions and a current picture dimensions; and signaling an indicator that indicates whether the position and the size of the rectangular region are with respect to the maximum picture dimensions or with respect to the current picture dimensions.

14. A method comprising:

receiving a coded packed picture, wherein rectangular regions of a picture are packed to generate the coded packed picture;

receiving metadata describing rectangular regions packed into the coded packed picture;

receiving a resampling ratio list, wherein the resampling ratio list comprises at least one resampling ratio;

receiving metadata that identifies which of the at least one resampling ratio in the resampling ratio list is used to resample at least one rectangular region of the rectangular regions of the picture;

receiving metadata indicating positions of the rectangular regions in a target picture; and receiving a unit size indicating a number of luma samples;

receiving, for a rectangular region of the picture, a top left position of the rectangular region in units, and a width and height of the rectangular region in the units; and receiving a top left location of the rectangular regions within the target picture formed from the coded packed picture, wherein the top left location of the rectangular regions within the target picture is intended to be used to form the target picture from the coded packed picture, wherein a size of the rectangular regions within the target picture is not signaled and inferred from a resampling ratio; and forming the target picture with positioning the rectangular regions in the target picture based on the indicated positions of the rectangular regions in the target picture, wherein the target picture comprises the resampled at least one rectangular region.

15. The method of claim 14 further comprising:

receiving an aspect ratio indicator, wherein the aspect ratio indicator comprising a first value indicates that numerator and denominator syntax elements used for determining at least one resampling ratio of the at least one rectangular region are not present, and wherein the aspect ratio indicator comprising a second value indicates that the numerator and denominator syntax elements used for determining at the least one resampling ratio of the at least one rectangular region are present.

16. The method of claim 14 further comprising: receiving an index for referencing the at least one resampling ratio in an array used for storing the at least one resampling ratio and/or the at least one rectangular region in an array used for storing the at least one rectangular region.

17. The method of claim 14 further comprising:

receiving a position and a size of a rectangular region;

wherein adaptive picture resolution coding is used to code the coded packed picture;

receiving a maximum picture dimensions and a current picture dimensions; and receiving an indicator that indicates whether the position and the size of the rectangular region are with respect to the maximum picture dimensions or with respect to the current picture dimensions.

18. The method of claim 17 further comprising:

receiving a unit size;

in response to the indicator indicating that the position and size of the rectangular region are with respect to the current picture dimensions: determining a position of a luma sample in the rectangular region to be a top left position of the rectangular region in units multiplied with the unit size, and determine a width and height of the luma sample in the rectangular region to be a width and height of the rectangular region in the units multiplied with the unit size;

in response to the indicator indicating that the position and the size of the rectangular region are with respect to the maximum picture dimensions: determining the position of the luma sample in the rectangular region based on the maximum picture dimensions, and determine the width and height of the luma sample in the rectangular region based on the maximum picture dimensions and dimensions of the coded packed picture; and determining the position of the luma sample in the rectangular region to be the top left position of the rectangular region in the units multiplied with the unit size, and determine the width and height of the luma sample in the rectangular region to be a width and height of the rectangular region in the units multiplied with the unit size.

* * * * *